(12) United States Patent
Nakai et al.

(10) Patent No.: US 8,917,406 B2
(45) Date of Patent: Dec. 23, 2014

(54) IMAGE READING APPARATUS FOR DETERMINING WHETHER A DOCUMENT CONTAINS A DISTINGUISHING PATTERN

(75) Inventors: Yoshiyuki Nakai, Osaka (JP); Koichi Sumida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1199 days.

(21) Appl. No.: 12/834,414

(22) Filed: Jul. 12, 2010

(65) Prior Publication Data

US 2011/0026063 A1 Feb. 3, 2011

(30) Foreign Application Priority Data

Jul. 31, 2009 (JP) ................................ 2009-179776

(51) Int. Cl.
*G06K 15/00* (2006.01)
*H04N 1/00* (2006.01)
*H04N 1/60* (2006.01)
*H04N 1/203* (2006.01)

(52) U.S. Cl.
CPC ....... *H04N 1/00846* (2013.01); *H04N 1/00013* (2013.01); *H04N 1/60* (2013.01); *H04N 1/00087* (2013.01); *H04N 1/00031* (2013.01); *H04N 1/2032* (2013.01); *H04N 1/00045* (2013.01); *H04N 1/00848* (2013.01); *H04N 2201/0081* (2013.01); *H04N 1/00023* (2013.01)
USPC ......... 358/1.14; 358/3.28; 382/100; 382/162; 382/165; 382/181

(58) Field of Classification Search
CPC .................................................. H04N 1/0084
USPC .............................................. 358/3.28, 1.14
See application file for complete search history.

(56) References Cited

U.S. PATENT DOCUMENTS

| 8,422,073 | B2* | 4/2013 | Murakami et al. ............. 358/1.9 |
| 8,503,037 | B2* | 8/2013 | Kulkarni et al. ............. 358/3.26 |
| 2006/0082804 | A1* | 4/2006 | Hiramatsu .................... 358/1.14 |
| 2008/0068682 | A1* | 3/2008 | Morikawa ..................... 358/521 |
| 2008/0180706 | A1* | 7/2008 | Yanagi ............................ 358/1.9 |
| 2008/0231912 | A1* | 9/2008 | Murakata ...................... 358/474 |
| 2008/0266615 | A1* | 10/2008 | Dokuni ......................... 358/474 |
| 2008/0297844 | A1 | 12/2008 | Dokuni |
| 2009/0080783 | A1* | 3/2009 | Hirohata ....................... 382/218 |
| 2010/0189311 | A1* | 7/2010 | Sacher et al. ................. 382/112 |
| 2010/0245898 | A1* | 9/2010 | Nakai et al. .................. 358/1.15 |

FOREIGN PATENT DOCUMENTS

| CN | 101316312 A | 12/2008 |
| CN | 101393414 A | 3/2009 |
| JP | 2000-215314 A | 8/2000 |
| JP | 2006-42034 A | 2/2006 |
| JP | 2006-135631 A | 5/2006 |
| JP | 2006-229466 A | 8/2006 |

* cited by examiner

*Primary Examiner* — Benjamin O Dulaney
(74) *Attorney, Agent, or Firm* — Birch, Stewart, Kolasch & Birch, LLP

(57) ABSTRACT

As provided with a first reading section and a second reading section for reading both surfaces of a document, an image reading apparatus respectively calculates gamma correction values in gamma correcting sections and correction factors in color correcting sections, and corrects colors of criteria images being read by the first reading section and the second reading section in accordance with sample data stored on a storing section in order to substantially match the colors of both criteria images. In addition, the image reading apparatus utilizes an distinctive color range common for the both surfaces which defines a color about a distinguishing pattern, in order to determine whether images of both surfaces contain the distinguishing pattern or not.

16 Claims, 25 Drawing Sheets

| READ VALUE | TARGET VALUE |
|---|---|
| $R_{in}(1)$ | $R_{target}(1)$ |
| $R_{in}(2)$ | $R_{target}(2)$ |
| ⋮ | ⋮ |
| $R_{in}(i)$ | $R_{target}(i)$ |
| ⋮ | ⋮ |

FIG. 6A

| READ VALUE | TARGET VALUE | |
|---|---|---|
| $R_{in}(1)\ G_{in}(1)\ B_{in}(1)$ | $R_{target}(1)$ | |
| $R_{in}(2)\ G_{in}(2)\ B_{in}(2)$ | $R_{target}(2)$ | LEAST SQUARE METHOD |
| $R_{in}(3)\ G_{in}(3)\ B_{in}(3)$ | $R_{target}(3)$ | $\longrightarrow R_{11},\ R_{12},\ R_{13}$ |
| ⋮ ⋮ ⋮ | ⋮ | |
| $R_{in}(i)\ G_{in}(i)\ B_{in}(i)$ | $R_{target}(i)$ | |
| ⋮ ⋮ ⋮ | ⋮ | |

FIG. 6B

| READ VALUE | TARGET VALUE | |
|---|---|---|
| $R_{in}(1)\ G_{in}(1)\ B_{in}(1)$ | $G_{target}(1)$ | |
| $R_{in}(2)\ G_{in}(2)\ B_{in}(2)$ | $G_{target}(2)$ | LEAST SQUARE METHOD |
| $R_{in}(3)\ G_{in}(3)\ B_{in}(3)$ | $G_{target}(3)$ | $\longrightarrow G_{11},\ G_{12},\ G_{13}$ |
| ⋮ ⋮ ⋮ | ⋮ | |
| $R_{in}(i)\ G_{in}(i)\ B_{in}(i)$ | $G_{target}(i)$ | |
| ⋮ ⋮ ⋮ | ⋮ | |

FIG. 6C

| READ VALUE | TARGET VALUE | |
|---|---|---|
| $R_{in}(1)\ G_{in}(1)\ B_{in}(1)$ | $B_{target}(1)$ | |
| $R_{in}(2)\ G_{in}(2)\ B_{in}(2)$ | $B_{target}(2)$ | LEAST SQUARE METHOD |
| $R_{in}(3)\ G_{in}(3)\ B_{in}(3)$ | $B_{target}(3)$ | $\longrightarrow B_{11},\ B_{12},\ B_{13}$ |
| ⋮ ⋮ ⋮ | ⋮ | |
| $R_{in}(i)\ G_{in}(i)\ B_{in}(i)$ | $B_{target}(i)$ | |
| ⋮ ⋮ ⋮ | ⋮ | |

F I G. 10
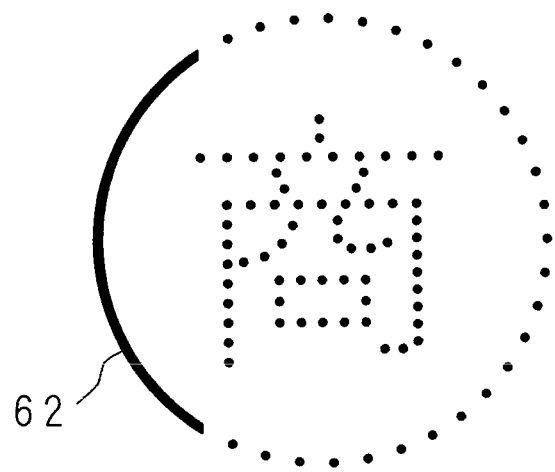

F I G. 1 2
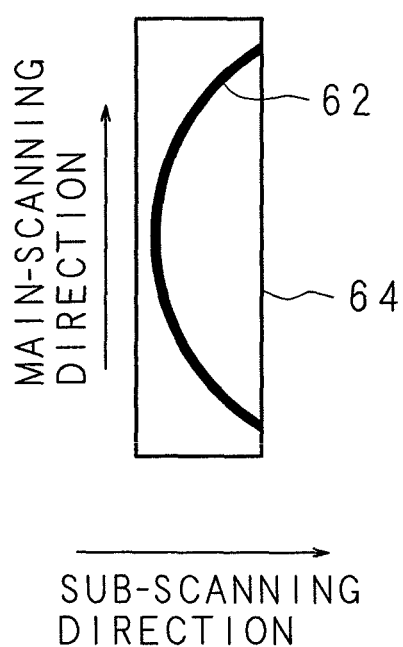

F I G. 14

|  | FIRST LINE 71 | SECOND LINE 72 | THIRD LINE 73 | FOURTH LINE 74 | FIFTH LINE 75 | SIXTH LINE 76 |
|---|---|---|---|---|---|---|
| FIRST REGION | 9 ≦ PIXEL NUMBER | PIXEL NUMBER ≦ 1 | PIXEL NUMBER ≦ 1 | PIXEL NUMBER ≦ 1 | PIXEL NUMBER ≦ 1 | PIXEL NUMBER ≦ 1 |
| SECOND REGION | PIXEL NUMBER ≦ 2 | 3 ≦ PIXEL NUMBER | 3 ≦ PIXEL NUMBER | 1 ≦ PIXEL NUMBER | 2 ≦ PIXEL NUMBER | 1 ≦ PIXEL NUMBER |
| THIRD REGION | PIXEL NUMBER ≦ 1 | PIXEL NUMBER ≦ 1 | PIXEL NUMBER ≦ 1 | PIXEL NUMBER ≦ 1 | PIXEL NUMBER ≦ 1 | PIXEL NUMBER ≦ 1 |

F I G. 15
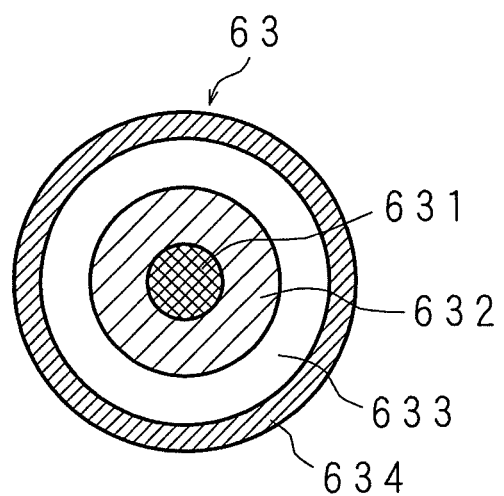

F I G. 16

|  | RANGE OF PIXEL NUMBER |
|---|---|
| FIRST DIVIDED REGION | 246 ≦ PIXEL NUMBER ≦ 300 |
| SECOND DIVIDED REGION | 250 ≦ PIXEL NUMBER ≦ 302 |
| THIRD DIVIDED REGION | 266 ≦ PIXEL NUMBER ≦ 310 |
| FOURTH DIVIDED REGION | 480 ≦ PIXEL NUMBER |

IMAGE READING APPARATUS FOR DETERMINING WHETHER A DOCUMENT CONTAINS A DISTINGUISHING PATTERN

This non-provisional application claims priority under 35 U.S.C. §119(a) on Patent Application No. 2009-179776 filed in Japan on Jul. 31, 2009, the entire content of which is hereby incorporated by reference.

BACKGROUND OF THE INVENTION

1. Field of the Invention

The present invention relates to an image reading apparatus that reads image recorded on a recording medium, such as a document. Furthermore, the present invention relates to an image reading apparatus and an image determining method for determining whether a read image contains a distinguishing pattern indicating a copy-protected image, such as paper money.

2. Description of Related Art

The image processing technology is well developed. The technology makes it possible optically read an image recorded on a document, such as a paper, and to form a duplication image that is a brilliant copy of the read image. For example, it is possible to make a high-quality full color copy, and to transmit a high-quality image with facsimile communication. There is an image reading apparatus that can optically read an image and make a brilliant copy of the read image, as described above. Such the image reading apparatus is often provided with a function for prohibiting to make a copy of a copy-protected image, such as a paper money or a financial security. Specifically, the image reading apparatus stores a distinguishing pattern indicating the copy-protected image and determines whether the stored distinguishing pattern is detected from the read image or not. When the stored distinguishing pattern is detected from the read image, the image reading apparatus decides that the read image is the copy-protected image, and sets to prohibit making a copy of the image.

As the image processing technology is developed greater, it increases higher the importance prohibiting to make a copy of the copy-protected image. Furthermore, as the technology is developed greater, it increases higher in number of image types whose copy should be prevented. On the other hand, a wide variety of documents is getting to be utilized with the image reading apparatus. The document may contain a pattern, as a part of the overall image, similar to the distinguishing pattern indicating the paper money, although the overall image of the document is not such the copy-protected image. In addition, the document may records an image whose colors and/or shape are similar to those of the copy-protected image. Thus, it causes higher risk that a not-distinguishing pattern is falsely detected as the distinguishing pattern and that a normal image is falsely detected as the copy-prevented image. If the detection standards are compromised in order to detect all the distinguishing patterns, it may cause higher the risk that a normal image is falsely detected as the copy-prevented image. If the detection standards are raised contrary, it may cause higher the risk that some copy-prevented images cannot be detected. Therefore, it is important to set the detection standards properly, in order to minimize the false detection and to maximize the true detection of the copy-protected image.

There is an image reading apparatus, for making a copy of read image, which is provided with one reading section for reading one surface of a document and another reading section for reading the other surface of the document. Thus, the image reading apparatus can simultaneously read an image on one surface of the document and an image on the other surface of the document. In addition, there is an image reading apparatus that has a conveyance reading mode for reading both surfaces of document passing on the conveyance path and a fix reading mode for reading both surfaces of document placed on the document table, and that can select to utilize the conveyance reading mode and the fix reading mode. It is possible to reduce the time required for reading both surfaces of the document by such the image reading apparatus that reads both surfaces simultaneously, greater than by an image reading apparatus that reverses the document after reading one surface of the document and then reads the other surface of the document. Furthermore, it is possible to simplify the conveyance path easier and reduce damage on the read document greater in the image reading apparatus that reads both surfaces simultaneously, than in the image reading apparatus that reverses the document for reading both surfaces. Moreover, it is possible to make the image reading apparatus in which a user can select the conveyance reading mode and the fix reading mode.

Generally, the image reading apparatus requires adjustment on the image reading function, in order to obtain proper results of a read image. For the adjustment, an image processing attribute of the image reading apparatus is-improved to obtain a predetermined quality of the read image. Such the image processing is known to include: shading correction for correcting the sensitivity variance of pixels or the irregular illuminance based on the light for the document in the read image; gamma correction for correcting the gray scale from bright section to dark section in the read image; color correction for correcting spectral attribute or color filter attribute of the light for the document in the color image reading apparatus and the like. The standard for the shading correction is generally obtained through reading a predetermined white board. The standards for the gamma correction and the color correction are generally obtained through reading a predetermined image. Thus, a predetermined standard image is utilized for the adjustment.

The image reading apparatus with respective reading sections for both surfaces of the document requires adjusting these two reading sections. The attribute of one reading section should be different from the characteristic of the other reading section within a permissible range, in order to prevent the difference between the image read by one reading section and the image read by the other reading section. Thus, a method is proposed for simplifying the adjustment of these two reading sections and for preventing the difference among the read images of both surfaces. For example, Japanese Patent Application Laid-Open No. 2006-42034, Japanese Patent Application Laid-Open No. 2006-135631 and Japanese Patent Application Laid-Open No. 2006-229466 propose such the method. The method in Japanese Patent Application Laid-Open No. 2006-42034 is directed for obtaining a color overlay image in which the read image of one surface of the document is overlaid on the read image of the other surface of the document. The method in Japanese Patent Application Laid-Open No. 2006-135631 is directed for simplifying the configurations of the image reading apparatus that is provided with two reading sections, reads both surfaces of the document and prevents the quality difference among the read images of both surfaces. The method in Japanese Patent Application Laid-Open No. 2006-229466 is directed for properly adjust the attributes of both reading sections and keeping the attribute of one reading section different from the attribute of the other reading section within a permissible range.

SUMMARY OF THE INVENTION

The function prohibiting to make a copy of the copy-protected image is required even for the image reading apparatus provided with the respective reading sections for reading both surfaces of the document. Although Japanese Patent Application Laid-Open No. 2006-42034, Japanese Patent Application Laid-Open No. 2006-135631 and Japanese Patent Application Laid-Open No. 2006-229466 may ensure reading both surfaces of the document, they are not in consideration of the function prohibiting to make a copy of the copy-protected image.

As described above, there are normal images containing a pattern similar to the distinguishing pattern indicating the copy-protected image. As a distinguishing pattern detection processing is performed for detecting the copy-protected image, the processing is generally performed on the basis of the binary image. A threshold value has to be set for obtaining the binary image. In the case that the set threshold value corresponds to the region having a high gradient of gamma curve, small changes in the original image data causes large changes in the binary image data based on the original image data. Thus, it has the risk that the binarization causes variation of the binary image data generated from the original image data. For example, even in the case that an original image is read plural times, there may be a slight difference between the image data obtained at first from the original image and the image data obtained at second from the original image. Although the distinguishing pattern detection processing requires setting a parameter (e.g., a parameter about pixel number) as the detection standard for the distinguishing pattern, the set parameter is obligated to be compromised for ensuring detection of the distinguishing pattern. Therefore, it may cause the higher risk that a not-distinguishing pattern is falsely detected as the distinguishing pattern and that a normal image is falsely detected as the copy-prevented image.

Even in the case that an image reading apparatus is provided with respective reading sections for both surfaces of a document and the read image of one surface of the document is different from the read image of the other surface of the document, it is possible to properly perform image processing: by storing the read image of the other surface onto a memory; by performing proper processes on the read image of one surface; then, by setting a parameter for performing proper processes on the read image of the other surface and by performing the processes on the read image stored in the memory. However, there are many distinguishing patterns. Thus, the distinguishing pattern detection processing requires setting huge numbers of parameters for improving precision of the detection. Therefore, it causes a problem that the performance of the image reading apparatus is decreased by setting huge numbers of parameters for performing proper processes on the read image of the other surface. It may be possible to inhibit decreasing the performance, by preparing a high-speed processing circuit dedicated to setting parameters or by preparing a circuit dedicated to the distinguishing pattern detection processing for the read image of one surface and another circuit dedicated to the distinguishing pattern detection processing for the read image of the other surface. However, it causes a problem that the configurations of the image reading apparatus become complex and the cost of the image reading apparatus is increased.

The present invention is made in view of such circumstances, and has an object to provide an image reading apparatus and an image determining method for keeping proper performance in addition to saving cost.

The above and further objects and features of the invention will more fully be apparent from the following detailed description with accompanying drawings.

BRIEF DESCRIPTION OF THE DRAWINGS

FIG. 6A, FIG. 6B and FIG. 6C are conceptual views showing brief summary for calculating a correction factor of color correction.

FIG. 10 is a schematic view showing an example of a part pattern that is a part of the distinguishing pattern.

FIG. 12 is a schematic view showing an example of a determination window.

FIG. 14 is a table showing an example about pixel number range.

FIG. 15 is a schematic view showing an example about the distinguishing pattern candidate image divided into plural regions.

FIG. 16 is a conceptual view showing an example about pixel number range for a distinctive color.

DESCRIPTION OF THE PREFERRED EMBODIMENTS

Hereinafter, embodiments of the present invention are described in detail with reference to drawings.
(Embodiment 1)

Figure 1:
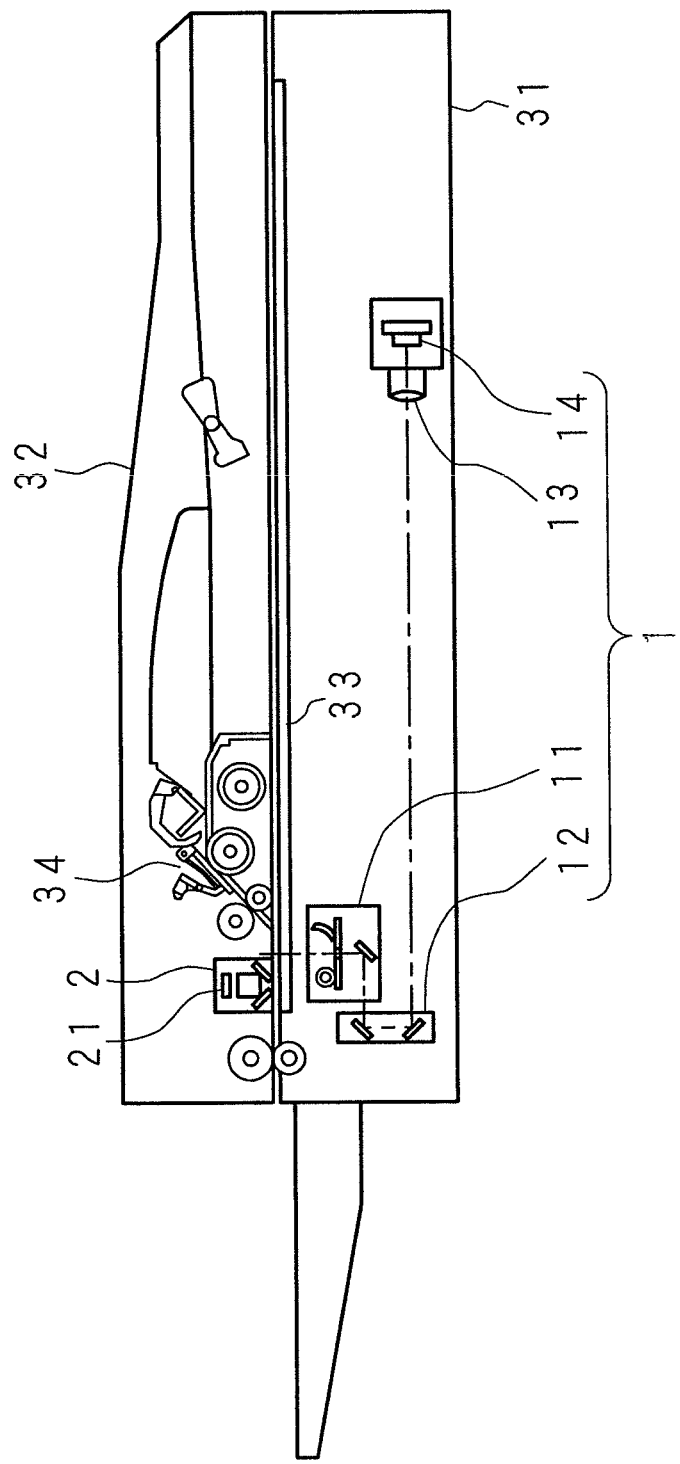
FIG. 1 is a composition diagram showing inner components of an image reading apparatus according to the present invention.

FIG. 1 is a composition diagram showing inner components of an image reading apparatus according to the present invention. The image reading apparatus according to the present invention is configured to read out an image from a document that is a recording medium, such as a paper, having a recorded image. The image reading apparatus includes: a bottom housing 31 provided with a first reading section (first reading means) 1 for reading out a color image recorded on one surface of a document; and a top housing 32 provided with a second reading section (second reading means) 2 for reading out a color image recorded on the other surface of the document.

One side of the top housing 32 is pivotably connected to one side of the bottom housing 31 with a hinge (not shown), and can be opened and closed against the bottom housing 31 about the hinge. The bottom housing 31 is provided with a scanner platen 33 on the superior surface. When the top housing 32 is opened, the superior surface of the scanner platen 33 is exposed. Further, the top housing 32 includes a conveying system (conveying means) 34. A document is put on the scanner platen 33, as the document records an image to be read or an interest image described later. A standard chart described later also can be put on the scanner platen 33. In addition, the conveying system 34 may convey and make the document pass on the scanner platen 33. The first reading section 1 is arranged under the scanner platen 33 in the bottom housing 31, and the second reading section 2 is arranged upper the scanner platen 33 in the top housing 32.

The first reading section 1 includes: a first scanning unit 11, a second scanning unit 12, an optical lens 13 and an image sensor 14. The first scanning unit 11 includes: an exposure lamp, such as a xenon lamp, that brings light on a surface of a document or standard chart being put on the scanner platen 33; and a first mirror for changing the direction of light reflected from the document or the standard chart. The first scanning unit 11 can move along the under surface of the scanner platen 33 at a predetermined scanning speed, with keeping a constant distance away from the under surface of the scanner platen 33. The second scanning unit 12 includes a second mirror and a third mirror for changing direction of the reflected light passing from the first mirror of the first scanning unit 11 toward the image sensor 14. When the first scanning unit 11 moves, the second scanning unit 12 follows the first scanning unit 11 at the half speed of the first scanning unit 11, and leads the reflected light to the optical lens 13. The optical lens 13 focuses the lead reflected light on the image sensor 14. The image sensor 14 consists of a linear charge coupled device (CCD) image sensor in which light receiving elements, such as photodiodes, are aligned linearly. The image sensor 14 performs photoelectric conversion on the focused reflected light sequentially, and outputs an electric signal based on the conversion. Thus, the image sensor 14 outputs line data in which color separation processing is performed on a read monochrome image or a read color image to generate R (red) color component, G (green) color component and B (blue) color component.

The first reading section 1 is configured to move the first scanning unit 11 and the second scanning unit 12, for reading the document or the standard chart being put on the scanner platen 33. Furthermore, the first reading section 1 is configured to fix the first scanning unit 11 and the second scanning unit 12 at respective predetermined positions as shown in FIG. 1, for reading the document conveyed by the conveying system 34. Alternatively, the first reading section 1 may include an optical unit configured with an exposure lamp, a lens, an image sensor and the like, and may move the unit for scanning a document.

The second reading section 2 is a contact image sensor (CIS), and includes an exposure lamp, such as light emitting diode (LED) array, a Selfoc lens array and an image sensor 21. The image sensor 21 is configured with linear complementary metal oxide semiconductor (CMOS) image sensor. The second reading section 2 is fixedly arranged, the exposure lamp brings light on the other surface of the document conveyed by the conveying system 34 and the Selfoc lens array focuses the light reflected from the document. The image sensor 21 receives the focused reflected light and performs photoelectric conversion on the received light. The image sensor 21 performs photoelectric conversion on the received light sequentially, and outputs an electric signal based on the conversion. Thus, the image sensor 21 outputs line data in which color separation processing is performed on a read monochrome image or a read color image to generate R (red) color component, G (green) color component and B (blue) color component. After the electric signal is output by the image sensor 14 and the image sensor 21, image processing is performed on the output electric signal and the output electrical signal becomes image data.

The image reading apparatus according to the present invention can select: a fix reading mode for making the first reading section 1 read a document being put on the scanner platen 33; a single surface reading mode for making the first reading section 1 or the second reading section 2 read a single surface of document conveyed by the conveying system 34; and a both surfaces reading mode for making the first reading section 1 and the second reading section 2 read both surfaces of document conveyed by the conveying system 34.

In the case that the fix reading mode is selected, a user opens the top housing 32, puts a document on the scanner platen 33 and closes the top housing 32. Then, the first reading section 1 moves the first scanning unit 11 and the second scanning unit 12, brings light on the single surface of the document being put on the scanner platen 33, and makes the image sensor 14 read out an image recorded on the single surface. In the case that the single surface reading mode is selected, the first reading section 1 fixes the first scanning unit 11 and the second scanning unit 12 at respective predetermined positions, and the first reading section 1 or the second reading section 2 reads a single surface of the document conveyed by the conveying system 34. In the case that the both surfaces reading mode is selected, the first reading section 1 fixes the first scanning unit 11 and the second scanning unit 12 at respective predetermined positions, and the first reading section 1 and the second reading section 2 read both surfaces of the document that is conveyed by the conveying system 34 and is passing between the first reading section 1 and the second reading section 2.

Figure 2:
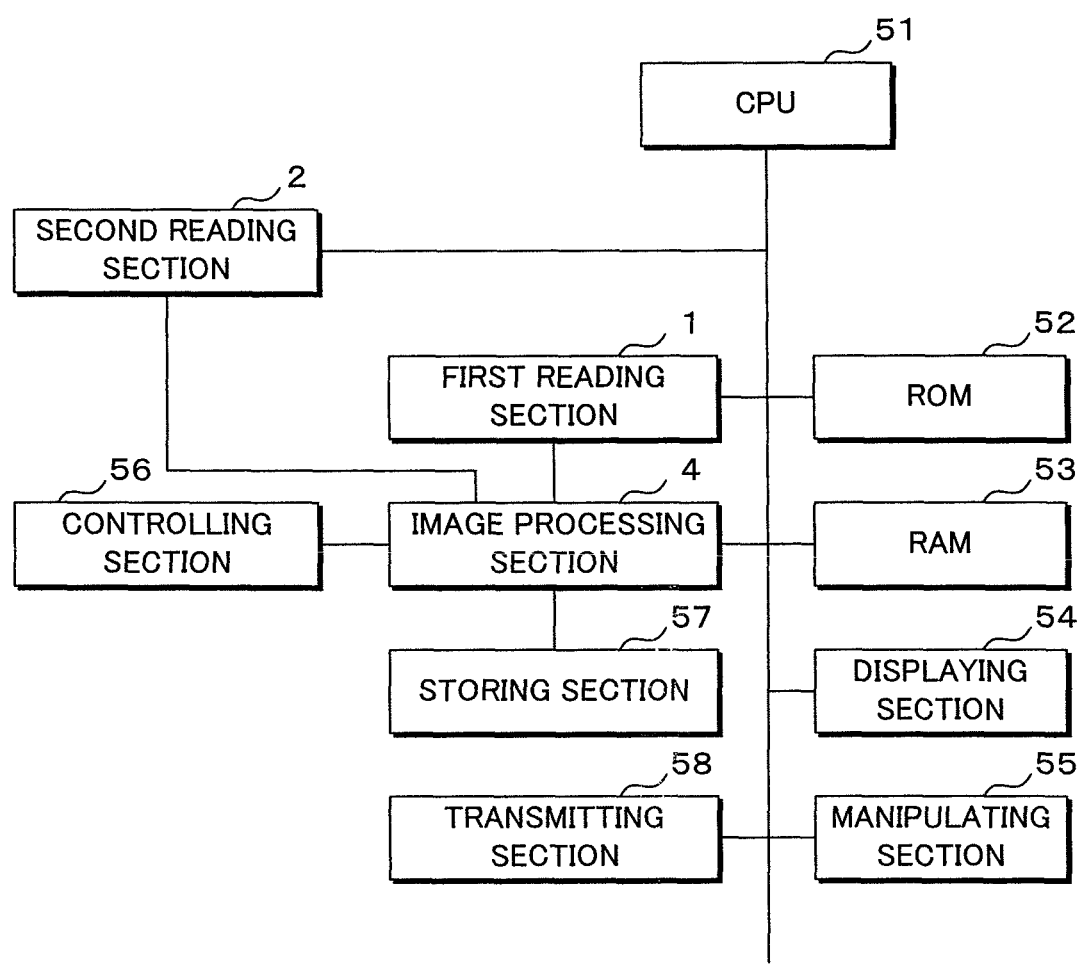
FIG. 2 is a block diagram showing electrical components of the image reading apparatus.

FIG. 2 is a block diagram showing electrical components of the image reading apparatus. The image reading apparatus includes: a CPU 51 that performs calculations; a ROM 52 that stores program required for operating the image reading apparatus; a RAM 53 that is a volatile memory and stores temporal data, such as image data; a displaying section 54 (e.g., liquid crystal display); and a manipulating section 55 (e.g., touch screen). The displaying section 54 displays information required for user's manipulation on the image reading apparatus, and the manipulating section 55 receives input information, such as several setting information, based on the user's manipulation. The CPU 51 is connected to the first reading section 1 and the second reading section 2. The first reading section 1 and the second reading section 2 are connected to an image processing section 4 that performs image processing on the electric signal being output by the image sensor 14 and the image sensor 21. The image processing section 4 is connected to a controlling section 56 and a storing section 57. The controlling section 56 is configured with: a CPU for performing calculations; a RAM for storing information generated by the calculations; a ROM for storing program required for performing the calculations; and the like, and performs image processing in the image processing section 4. The storing section 57 is configured with a non-volatile memory or a hard disk. Furthermore, the CPU 51 is connected to a transmitting section 58 for transmitting image data, on which the image processing section 4 has performed image processing, toward an external apparatus (e.g., personal computer). The CPU 51 controls an operation of each section. For example, the CPU 51 controls the first reading section 1 and/or the second reading section 2 to read an image with the fix reading mode, the single surface reading mode or the both surfaces reading mode selected by the input information corresponding to the user's manipulation that is received from the manipulating section 55. Alternatively, the image reading apparatus according to the present invention may be a copying apparatus, a facsimile apparatus or a multifunction printer that further includes an image recording section for recording a formed image onto a recording paper based on the image data.

Figure 3:
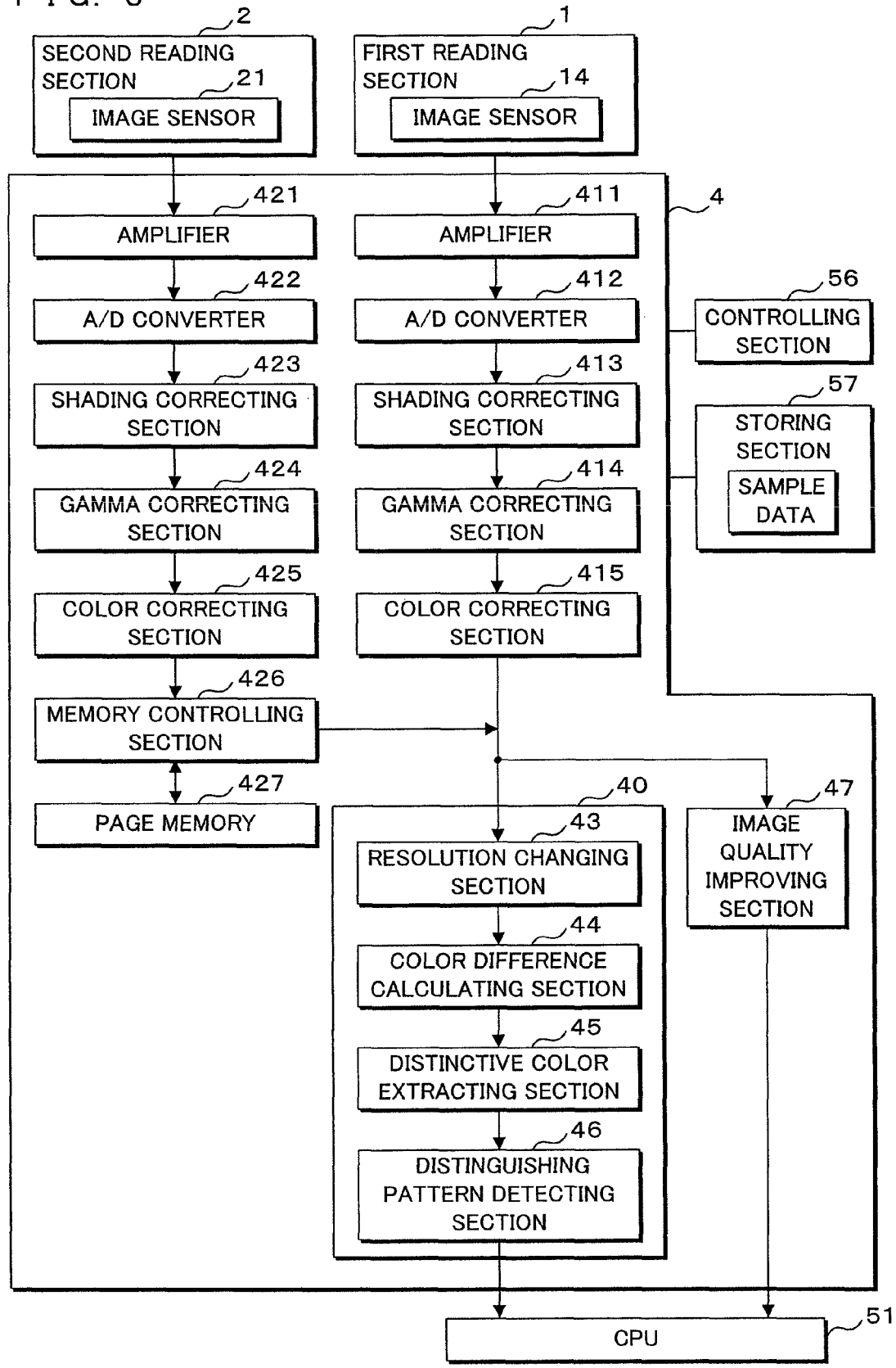
FIG. 3 is a block diagram showing inner components of an image processing section.

FIG. 3 is a block diagram showing inner components of the image processing section 4. The image processing section 4 includes: an amplifier 411 connected to the image sensor 14 of the first reading section 1; an A/D converter 412; a shading correcting section 413; a gamma correcting section 414; and a color correcting section 415. The image sensor 14 outputs the electric signal for respective R, G and B color components toward the amplifier 411. After receiving the output electric signal, the amplifier 411 amplifies the received electric signal at a predetermined amplification factor, and outputs the amplified electric signal toward the A/D converter 412. After receiving the amplified electric signal, the A/D converter 412 converts the received electric signal into digital RGB signal. The RGB signal represents an intensity value for respective R, G and B colors about plural pixels of the read image. The intensity value for each color corresponds to light reflectance against the image recorded on the document, i.e., image density for each color that is contained in the image recorded on the document. The A/D converter 412 outputs the digital RGB signal to the shading correcting section 413. After receiving the digital RGB signal, the shading correcting section 412 performs shading correction processing on the received RGB signal and then outputs the corrected RGB signal to the gamma correcting section 414. After receiving the RGB signal, the gamma correcting section 414 performs gamma correction processing on the received RGB signal, and then outputs the corrected RGB signal to the color correcting section 415. After receiving the RGB signal, the color correcting section 415 performs color correction processing on the received RGB signal, in order to obtain the finally corrected image data substantially the same as another image data that is obtained by another image reading apparatus based on the same image.

The image processing section 4 includes: an amplifier 421 connected to the image sensor 21 of the second reading section 2; an A/D converter 422; a shading correcting section 423; a gamma correcting section 424; and a color correcting section 425. The image sensor 21 outputs the electric signal for respective R, G and B color components toward the amplifier 421. The output electric signal is amplified by the amplifier 421, and then converted into digital RGB signal by the A/D converter 422. The converted RGB signal is corrected by shading correction processing of the shading correcting section 423, by gamma correction processing of the gamma correcting section 424 and then by color correction processing of the color correcting section 425. Thus, the gamma correction processing as well as the color correction processing are performed on the output signal from the image sensor 14 independent of the output signal from the image sensor 21, and vice versa. Therefore, it is possible to reduce the differences about brightness and color balance in front surface image data and back surface image data, as the differences may be caused by variance of performance in image reading apparatuses, or variation of light source or light receiving element provided to the image reading apparatuses. The color correcting section 425 is connected to a page memory 427 through a memory controlling section 426. The color correcting section 425 inputs the RGB signal, on which the color correction processing has been performed, into the page memory 427 through the memory controlling section 426. The page memory 427 then temporally stores image data consisting of the RGB signal.

The color correcting section 415 and the memory controlling section 426 are connected to an image determining section (determining means) 40 that determines whether the read image is a copy-protected image or not, and to an image quality improving section 47 for improving quality of image represented by image data consisting of the RGB signal on which the color correction processing has been performed. The color correcting section 415 inputs the RGB signal, on which the color correction processing has been performed, into the image determining section 40 and the image quality improving section 47.

The image determining section 40 includes: a resolution changing section 43; a color difference calculating section 44; a distinctive color extracting section 45; and a distinguishing pattern detecting section 46. The resolution changing section 43 changes resolution of image represented by image data consisting of RGB signal. For example, the resolution changing section 43 changes 600 dpi image data into 100 dpi image data. The color difference calculating section 44 calculates the difference between G and R color components, the difference between G and B color components and the difference between R and B color components in the image data on which the resolution change processing has been performed. The distinctive color extracting section 45 determines, in accordance with the RGB signal and the calculated differences, whether each pixel color in the image is identical to a distinctive color. The distinctive color means a color of distinguishing pattern indicating a copy-protected image. The distinctive color extracting section 45 extracts a distinctive color pixel having the distinctive color from the read image, in accordance with the determination results. Then, the distinctive color extracting section 45 inputs binary image data into the distinguishing pattern detecting section 46, as the binary image data represents the extracted distinctive color pixels distinct from the other pixels. The distinguishing pattern detecting section 46 is configured to detect the distinguishing pattern from the image represented by the binary image data. Thus it is possible to determine whether the read image contains the distinguishing pattern or not. In short, the case that the distinguishing pattern is detected from the image represented by the binary image data means the fact that the read image is the copy-protected image containing the distinguishing pattern. The case that the distinguishing pattern is not detected from the image represented by the binary image data means the fact that the read image is not the copy-protected and does not contain the distinguishing pattern. The distinguishing pattern detecting section 46 outputs the determination results to the CPU 51. The image quality improving section 47 performs image quality improvement processing on the image data consisting of the RGB signal on which the color correction processing has been performed, and then outputs the image data, on which the image quality improvement processing has been performed, toward the CPU 51. The image quality improvement processing is for improving quality of image represented by image data. When the distinguishing pattern detecting section 46 outputs the determination result representing the fact that the read image contains the distinguishing pattern, the image quality improving section 47 is considered to output image data that represents the copy-protected image. Therefore, the CPU 51 performs prohibitive processing that prohibits outputting image data.

After the image determining section 40 and the image quality improving section 47 process the image data being input from the color correcting section 415, the memory controlling section 426 inputs the image data stored on the page memory 427 into the image determining section 40 and the image quality improving section 47. Thus, the image processing is started for the image read by the second reading section 2 from a surface of the document, after the image processing is completed for the read image generated from the other surface of the document by the first reading section 1. Hence, this configuration leads utilizations of the pair of image determining section 40 and the image quality improving section 47 over time, and does not require providing two pairs of image determining section and image quality improving section for the image read by the first reading section 1 and for the image read by the second reading section 2. Therefore, it is possible to reduce the size of the image reading apparatus and to save cost for the image reading apparatus.

Figure 4:
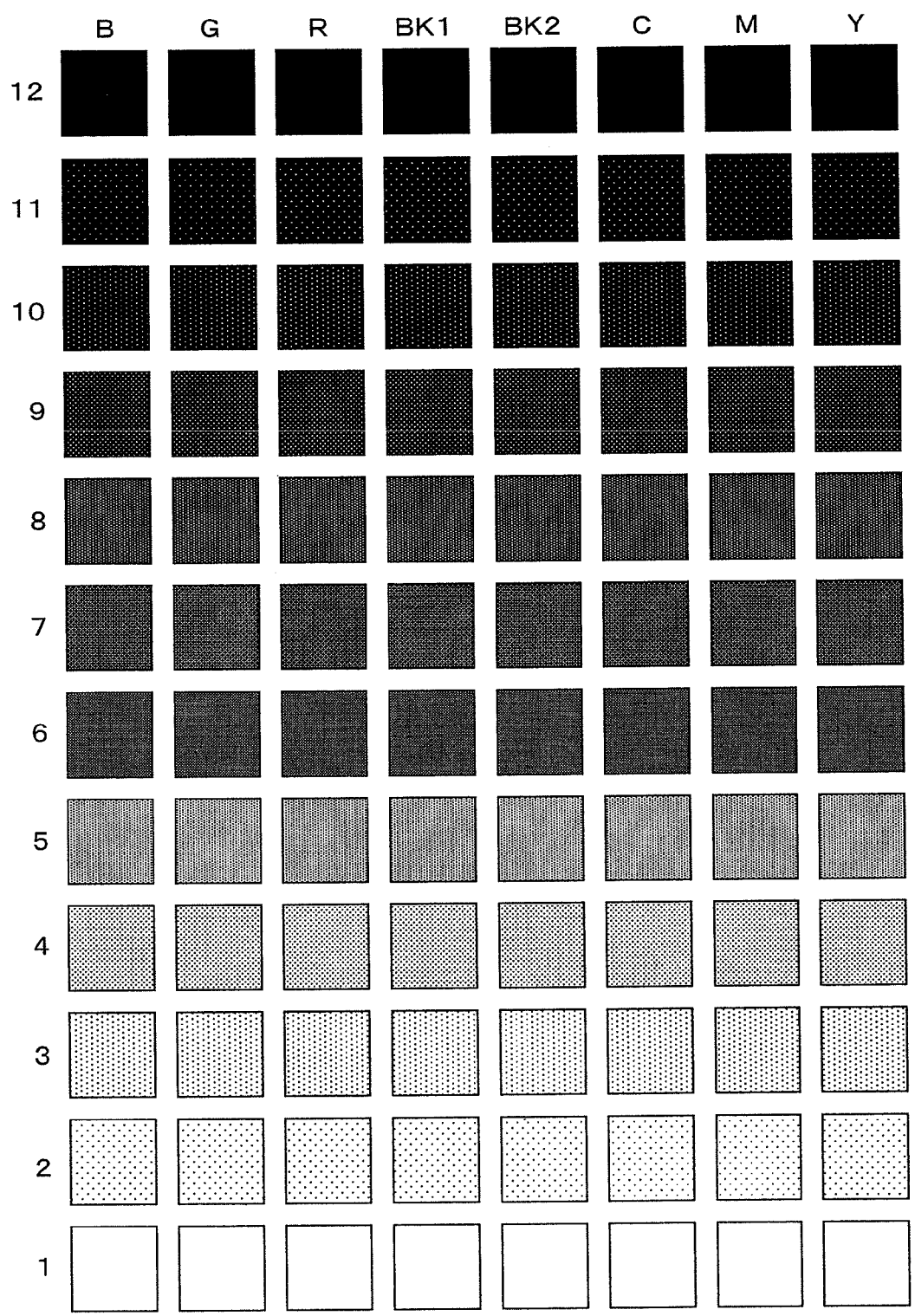
FIG. 4 is a schematic view showing an example of a standard chart.

As the gamma correcting section 414 and the gamma correcting section 424 perform the gamma correction processing, a gamma correction value of the gamma correction processing is previously calculated by the controlling section 56 on the basis of the read result of the standard chart. The standard chart is, for example, a paper on which plural colors are recorded for a criteria utilized in the image processing. Each of the plural colors is provided with a predetermined chroma and a predetermined density. In short, the standard chart means the criteria image according to the present invention. FIG. 4 is a schematic view showing an example of the standard chart. The standard chart is configured with plural color patches that are arranged in vertical and horizontal directions. Each of the plural color patches is filled with one color having a predetermined chroma and a predetermined density. FIG. 4 illustrates that each of colors (B, G, R, BK1, BK2, C, M and Y) is provided with 12 levels of densities and the color with each level fills one color patch. In FIG. 4, the density level is represented by numerals (1-12) and the larger number means the greater concentrated density. Among the BK1 and BK2, one is a black for color image and the other is a black for monochrome image. Although all color patches are illustrated with black and white in FIG. 4 for illustration purpose, the actual standard chart is provided with color patches filled with various colors. It should be noted that the standard chart in FIG. 4 is an example and that the standard chart may have the number of colors less than the number of colors in FIG. 4.

The storing section 57 previously stores sample data that is utilized as the samples of image data generated in response to reading the standard chart. The sample data is configured to include a target value for the RGB signal generated in response to reading each color patch in the standard chart. The target value is an intensity value of RGB signal, which is generated for each color patch when an ideal image reading apparatus reads the standard chart, and shows about an ideal color of each color patch recorded on the standard chart. The sample data is, for example, generated when a specific standard image-reading apparatus reads the standard chart. Alternatively, the sample data may be logically generated by a method, such as a simulation of ideal optical condition.

The first reading section 1 and the second reading section 2 read the standard chart, respectively. The controlling section 56 compares the generated image data in response to the image reading of the first reading section 1 with the sample data, and obtains the gamma correction value. In addition, the controlling section 56 compares the generated image data in response to the image reading of the second reading section 2 with the sample data, and obtains another gamma correction value. The image sensor 14 of the first reading section 1 receives light reflected from each color patch recorded on the standard chart, and outputs electric signals of R, G and B colors for each color patch. The shading correcting section 413 performs the shading correction processing on the output electric signals of R, G and B colors for each color patch. The controlling section 56 averages the values of the electric signals of R, G and B colors for each color patch on which the shading correction processing has been performed and obtains read values of the electric signals of R, G and B colors for each color patch. The read value is an intensity value of the RGB signal obtained in response to the image reading of the first reading section 1, as well as the image reading of the second reading section 2. The read value corresponding to a color patch represents an intensity value for showing a color of the color patch on the standard chart being actually read by the image reading apparatus. The controlling section 56 reads out the sample data from the storing section 57, compares the target value of the RGB signal corresponding to each color patch with the read value of the RGB signal on which the shading correcting section 413 has performed the shading correction processing, and calculates the gamma correction value.

Figures 5A, 5B:
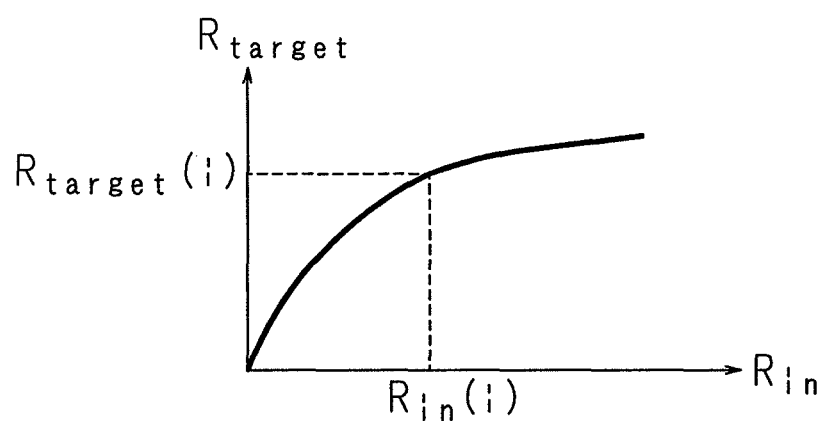
FIG. 5A and FIG. 5B are conceptual views showing brief summary for calculating a gamma correction value.

FIG. 5A and FIG. 5B are conceptual views showing brief summary for calculating the gamma correction value. Hereinafter, the target value of the RGB signal is described by $R_{target}$, $G_{target}$ and $B_{target}$. The read value of the RGB signal corresponding to a color patch is described by $R_{in}$, $G_{in}$ and $B_{in}$. As shown in FIG. 5A, the controlling section 56 associates the target value of R signal corresponding to a color patch with the read value of R signal corresponding to the same color patch, and arranges pairs of such the target value and the read value in signal intensity order. In FIG. 5A, the $R_{in}$ (i) and the $R_{target}$ (i) are R signals for the same color patch. FIG. 5B illustrates a correspondence curve of the read value of the R signal ($R_{in}$) and the target value of the R signal ($R_{target}$). This correspondence curve is a gamma curve for converting the read value $R_{in}$ into the target value $R_{target}$. The controlling section 56 performs a linear interpolation processing on the read value $R_{in}$ and the target value $R_{target}$, obtains the correspondence between an arbitrary read value of the R signal and the gamma correction value showing one-to-one correspondence with the read value based on the gamma curve as shown in FIG. 5B, and generates a table showing the obtained correspondence between the read value and the gamma correction value. The read value included in the table is the read value $R_{in}$ generated for each color patch on which the linear interpolation processing has been performed, and the gamma correction value included in the table is the target value $R_{target}$ generated for each color patch on which the linear interpolation processing has been performed. In the generated table, read values of R signal are associated with gamma correction values of R signal in one-to-one correspondence manner. Thus, it is possible to read out the gamma correction value associated with the read value from the table, and to convert an arbitrary read value into the gamma correction value generated by the linear interpolation processing performed on the target value. Similarly, the controlling section 56 generates a table showing the obtained correspondence between the read value of G signal and the gamma correction value, based on the read value $G_{in}$ of G signal and the target value $G_{target}$ of G signal, and generates a table showing the obtained correspondence between the read value of B signal and the gamma correction value, based on the read value $B_{in}$ of B signal and the target value $B_{target}$ of B signal. The controlling section 56 inputs the generated tables for R, G and B signals into the gamma correcting section 414. The gamma correcting section 414 stores the input tables and then utilizes the stored tables as look-up tables (LUTs). Thus, the gamma correcting section 414 converts the read value of RGB signal into the gamma correction value and performs the gamma correction processing for the RGB signal.

Similarly, the image sensor 21 of the second reading section 2 outputs electric signals of R, G and B colors for each color patch. The shading correcting section 423 performs the shading correction processing on the output electric signals of R, G and B colors for each color patch. The controlling section 56 generates tables showing the obtained correspondence between the read values and the gamma correction values. The controlling section 56 inputs the generated tables into the gamma correcting section 424. The gamma correcting section 424 stores the input tables and then utilizes the stored tables as LUTs. Thus, the gamma correcting section 424 converts the read value of RGB signal into the gamma correction value and performs the gamma correction processing for the RGB signal.

As the color correcting section 415 requires the correction factor for performing processing, the correction factor is calculated by the controlling section 56 based on the read result of the standard chart. The controlling section 56 compares the read value of RGB signal on which the gamma correcting section 414 has performed the gamma correction processing and the target value of RGB signal for each color patch on the standard chart, and thus calculates the correction factor for the color correction processing performed by the color correcting section 415. As the color correcting section 415 performs the color correction processing, the color correction processing is configured to convert the read value of RGB signal into a value closer to the target value, in order to make the color of read image be substantially the same as the color shown by the sample data. The color correcting section 415 performs a matrix operation for converting the RGB signal. The following formula (1) represents the ideal correspondence between the read values of RGB signal ($R_{in}$, $G_{in}$ and $B_{in}$) and the target values of RGB signal ($R_{target}$, $G_{target}$ and $B_{target}$). In the formula (1), the correction factors of the color correction are represented by R11, R12, R13, G11, G12, G13, B11, B12 and B13.

[Formula (1)]

$$\begin{pmatrix} R_{target} \\ G_{target} \\ B_{target} \end{pmatrix} = \begin{pmatrix} R_{11} & R_{12} & R_{13} \\ G_{11} & G_{12} & G_{13} \\ B_{11} & B_{12} & B_{13} \end{pmatrix} \begin{pmatrix} R_{in} \\ G_{in} \\ B_{in} \end{pmatrix} \quad (1)$$

FIG. 6A, FIG. 6B and FIG. 6C are conceptual views showing brief summary for calculating a correction factor of color correction. As shown in FIG. 6A, the controlling section 56 associates the target value of R signal for a color patch with the read values of RGB signal for the same color patch. Then, the controlling section 56 substitutes the associated target value of R signal and the read values of RGB signal into the formula (1), and generates a correspondence formula for the target value of R signal and the read values of RGB signal. Thus, the controlling section 56 generates the correspondence formula: $R_{target}(i)=R11R_{in}(i)+R12G_{in}(i)+R13B_{in}(i)$. In the case that "N" is the number of color patches read from the standard chart, the controlling section 56 generates the correspondence formulas (i=1~N). The controlling section 56 performs a least square method with the generated "N" correspondence formulas, and thus calculates the correction factors R11, R12 and R13 of the correspondence formulas.

As shown in FIG. 6B, the controlling section 56 similarly associates the target value of G signal for a color patch with the read values of RGB signal for the same color patch, generates the correspondence formulas (i=1~N): $G_{target}(i)=G11R_{in}(i)+G12G_{in}(i)+G13B_{in}(i)$. The controlling section 56 similarly performs the least square method with the generated "N" correspondence formulas, and thus calculates the correction factors G11, G12 and G13 of the correspondence formulas. As shown in FIG. 6C, the controlling section 56 furthermore associates the target value of B signal for a color patch with the read values of RGB signal for the same color patch, generates the correspondence formulas (i=1~N): $B_{target}(i)=B11R_{in}(i)+B12G_{in}(i)+B13B_{in}(i)$. The controlling section 56 similarly performs the least square method with the generated "N" correspondence formulas, and thus calculates the correction factors B11, B12 and B13 of the correspondence formulas.

As described above, the controlling section 56 calculates the correction factors R11, R12, R13, G11, G12, G13, B11, B12 and B13 utilized for the color correction processing, and inputs the calculated correction factors into the color correcting section 415. The color correcting section 415 stores the input correction factors, and then performs the matrix operation represented by a formula (2) described below with utilizing the stored correction factors. Thus, the color correcting section 415 performs the color correction processing to convert the input read values $R_{in}$, $G_{in}$ and $B_{in}$ of RGB signal by the gamma correcting section 414 into R value, G value and B value of the formula (2).

[Formula (2)]

$$\begin{pmatrix} R \\ G \\ B \end{pmatrix} = \begin{pmatrix} R_{11} & R_{12} & R_{13} \\ G_{11} & G_{12} & G_{13} \\ B_{11} & B_{12} & B_{13} \end{pmatrix} \begin{pmatrix} R_{in} \\ G_{in} \\ B_{in} \end{pmatrix} \quad (2)$$

Similarly, the controlling section 56 compares the read value of RGB signal on which the gamma correcting section 424 has performed the gamma correction processing and the target value of RGB signal for each color patch on the standard chart, and thus calculates the correction factor for the color correction processing performed by the color correcting section 425. Then, the controlling section 56 inputs the calculated correction factors into the color correcting section 425. The color correcting section 425 stores the input correction factors, and then performs the matrix operation represented by the formula (2) with utilizing the stored correction factors. Thus, the color correcting section 415 performs the color correction processing on the RGB signal being input from the gamma correcting section 424.

As described above, it is possible to obtain the proper gamma correction values and the proper correction factors of the color correction processing that improve the RGB signal generated by the actual image reading of the standard chart to be substantially the same as the sample data that shows the sample of image data to be generated in response to the image reading of the standard chart. The image reading is dependent on, for example, an optical attribute of the image reading apparatus, although each individual image reading apparatus possesses a specific optical attribute. In short, there are variations in the optical attributes of image reading apparatuses. Thus, there is a problem to cause various RGB signals even from the same image that is read by the image reading apparatuses. However, this embodiment obtains the proper gamma correction values and the proper correction factors of the color correction processing that improve the read values generated by the image reading of the standard chart to be substantially the same as the sample data, and then performs the gamma correction processing and color correction processing on the obtained RGB signal. Therefore, it is possible to obtain the corrected RGB signal which is substantially the same in any image reading apparatus. The corrected RGB signal is substantially the same as the RGB signal generated by the ideal image reading apparatus. Furthermore, this embodiment obtains the gamma correction values and the correction factors for the color correction processing that are utilized for the image being read by the first reading section 1, independently from the gamma correction values and the correction factors for the color correction processing that are utilized for the image being read by the second reading section 2. Thus, it is possible to obtain the corrected RGB signal that is substantially the same in both cases that the image is read by the first reading section 1 and by the second reading section 2. Therefore, the image reading apparatus according to the present invention can read an image and then generate proper image data.

Figure 7:
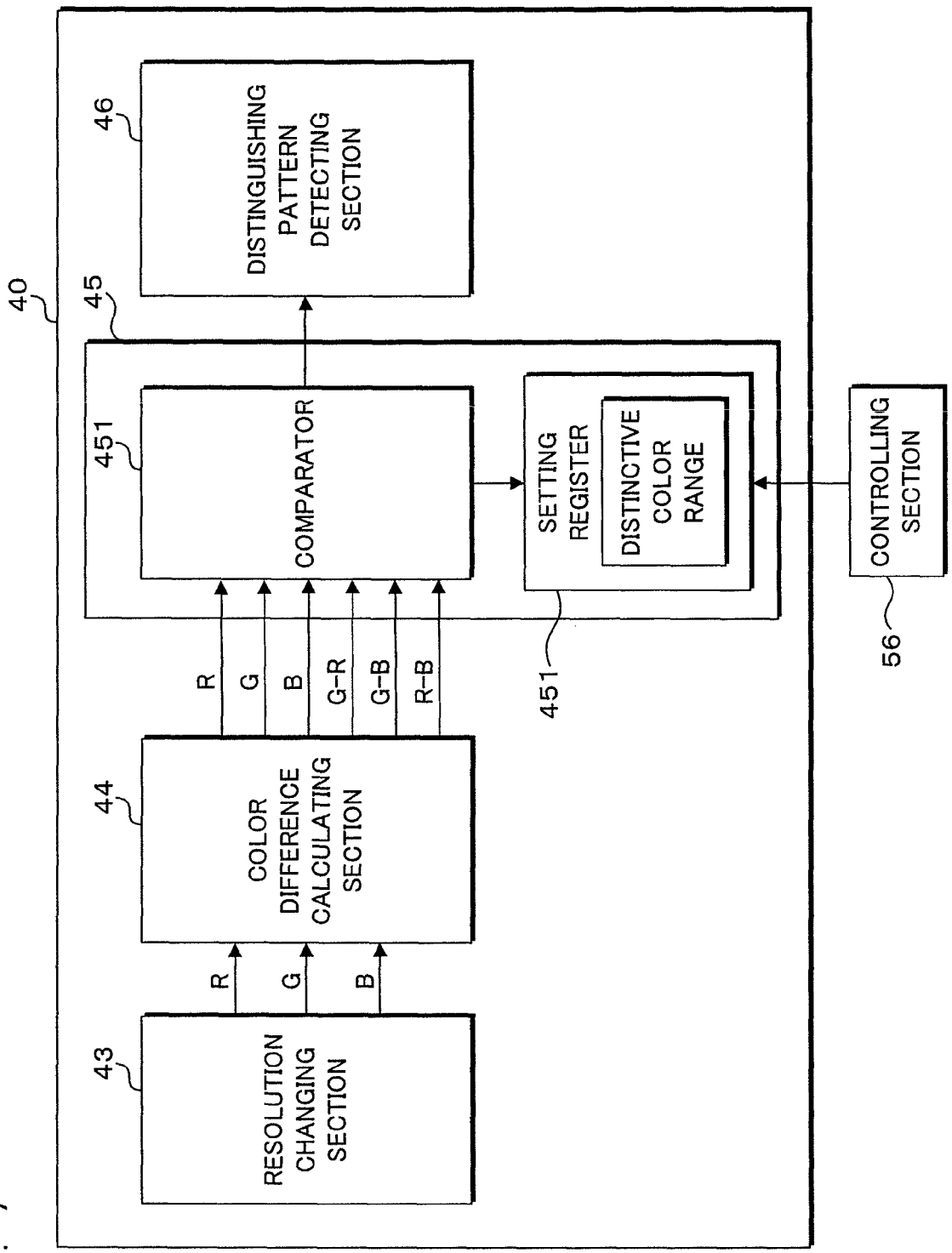
FIG. 7 is a block diagram showing inner components of a distinctive color extracting section and input and output in an image determining section.

FIG. 7 is a block diagram showing inner components of a distinctive color extracting section 45, and input and output in the image determining section 40. The resolution changing section 43 receives the RGB signal on which the color correction processing has been performed, from the color correcting section 415 or the memory controlling section 426. The resolution changing section 43 changes the resolution of image represented by the image data consisting of the RGB signal. Specifically, the resolution changing section 43 averages the RGB signals of adjacent pixels in order to reduce pixel number in the image, or performs the interpolation on the RGB signals between the adjacent pixels in order to increase pixel number in the image. For example, in the case that the read image has too large resolution, the image determining section 40 happens to require much time for the processing due to the large data amounts. Thus, the resolution is changed into a proper resolution, for example, 600 dpi image data is changed into 100 dpi image data, for the image determining section 40 performing image processing. The resolution changing section 43 inputs the RGB signal, whose resolution has been changed, into the color difference calculating section 44.

The color difference calculating section 44 calculates (G−R) signal on which R signal is subtracted from G signal, (G−B) signal on which B signal is subtracted from G signal and (R−B) signal on which B signal is subtracted from R signal, based on the input RGB signal. If the RGB signal is represented by 8 bits, the (G−R) signal, as well as the (G−B) signal and the (R−B) signal, may become a negative value. Therefore, the RGB signal is represented by 9 bits. The R, G, B, (G−R), (G−B) and (R−B) signals correspond to color parameters according to the present invention, respectively. The color difference calculating section 44 inputs the R, G, B, (G−R), (G−B) and (R−B) signals into the distinctive color extracting section 45.

The distinctive color extracting section 45 extracts distinctive color pixels, whose color is identical to the color of distinguishing pattern, from the read image in order to facilitate the detection of distinguishing pattern that is a distinctive image pattern contained in the copy-protected image. The distinctive color extracting section 45 includes a comparator 415 and a setting register 425. The comparator 451 receives the R, G, B, (G−R), (G−B) and (R−B) signals being respectively input by the color difference calculating section 44. The setting register 452 stores distinctive color range information of the R, G, B, (G−R), (G−B) and (R−B) signals for identifying the distinguishing pattern color. The distinctive color range includes threshold values for setting upper limits and lower limits of the R, G, B, (G−R), (G−B) and (R−B) signals. Specifically, the distinctive color range consists of the lower limit $R_{min}$ and the upper limit $R_{max}$ of the R signal, the lower limit $G_{min}$ and the upper limit $G_{max}$ of the G signal, the lower limit $B_{min}$ and the upper limit $B_{max}$ of the B signal, the lower limit $(G-R)_{min}$ and the upper limit $(G-R)_{max}$ of the (G−R) signal, the lower limit $(G-B)_{min}$ and the upper limit $(G-B)_{max}$ of the (G−B) signal, and the lower limit $(R-B)_{min}$ and the upper limit $(R-B)_{max}$ of the (R−B) signal, for identifying the distinguishing pattern color of pixel. For example, in the case that "255" represents pale color, "0" represents dark color and the distinguishing pattern color is vermillion, the setting register 452 stores the distinctive color range consisting of $R_{min}=40$, $R_{max}=160$, $G_{min}=0$, $G_{max}=95$, $B_{min}=0$, $B_{max}=75$, $(G-R)_{min}=-95$, $(G-R)_{max}=-5$, $(G-B)_{min}=-15$, $(G-B)_{max}=35$, $(R-B)_{min}=5$ and $(R-B)_{max}=105$.

This embodiment utilizes the (G−R) signal, the (G−B) signal and the (R−B) signal, in addition to the R signal, the G signal and the B signal, for setting the distinctive color range. Therefore, it is possible to set the range of distinguishing pattern color more precisely than the setting method with only the R signal, the G signal and the B signal. The image reading apparatus according to the present invention may utilize another color parameter for setting the distinctive color range.

The comparator 451 compares the R, G, B, (G−R), (G−B) and (R−B) signals being input from the color difference calculating section 44 and the distinctive color range stored by the setting register 452, for each pixel in the read image. Thus, the comparator 451 determines whether each signal falls within the distinctive color range or not. In other words, the comparator 451 determines: whether the R signal is not less than the $R_{min}$ and not more than the $R_{max}$; whether the G signal is not less than the $G_{min}$ and not more than the $G_{max}$; whether the B signal is not less than the $B_{min}$ and not more than the $B_{max}$; whether the (G−R) signal is not less than the $(G-R)_{min}$ and not more than the $(G-R)_{max}$; whether the (G−B) signal is not less than the $(G-B)_{min}$ and not more than the $(G-B)_{max}$; and whether the (R–B) signal is not less than the $(R-B)_{min}$ and not more than the $(R-B)_{max}$. When determining that all the signals fall within the distinctive color range, the comparator 451 treats the color of comparied pixel as the distinctive color and sets "1" to the pixel value of the compared pixel. When determining that any of signals do not fall within the distinctive color range, the comparator 451 treats the color of compared pixel as the indistinctive color and sets "0" to the pixel value of the compared pixel. The comparator 451 decides the pixel value for each pixel in the read image and inputs binary image data into the distinguishing pattern detecting section 46, as the binary image data consists of pixel values represented by "1" and pixel values represented by "0".

In the case that the respective RGB signal consists of 8 bits, the data amount for each pixel becomes $1/24$ because the pixel value for each pixel is represented as "0" or "1" by the comparator 451. Furthermore, in the case that the resolution changing section 43 changes the resolution in the main-scanning direction to be $1/3$ and the resolution in the sub-scanning direction to be $1/3$, the read image has data amounts reduced to $1/216 (=1/3 \times 1/3 \times 1/24)$. As the distinguishing pattern detecting section 46 treats the reduced amounts of data, it is possible to reduce burden on the distinguishing pattern detecting section 46. The setting register 452 stores the distinctive color range for each distinguishing pattern of the copy-protected image, as there are plural copy-protected images and there may be plural distinguishing patterns for each of the plural copy-protected images. The comparator 452 repeats the processing for the number of the distinctive color ranges stored by the setting register 452, and outputs the binary image for each of the plural distinguishing patterns. Alternatively, this embodiment may include as many distinctive color extracting sections arranged in parallel as the plural distinguishing patterns, and each of the distinctive color extracting sections may output the binary image data for the corresponding distinguishing pattern. Alternatively, in the case that some distinguishing patterns include the same distinctive color, the setting register 452 may store one distinctive color range common for these distinguishing patterns and the comparator 451 may output the binary image common for these distinguishing patterns.

Next, it will be described about the processing performed by the distinguishing pattern detecting section 46. The distinguishing pattern detecting section 46 detects a part pattern contained in the distinguishing pattern on an image. When detecting the part pattern, the distinguishing pattern detecting section 46 starts to detect the distinguishing pattern on the image.

Figure 8:
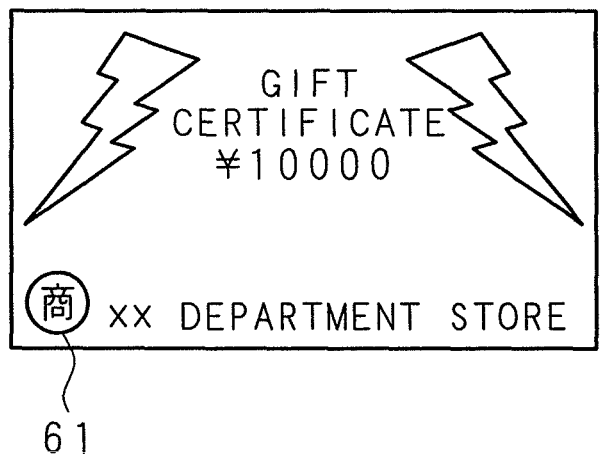
FIG. 8 is a schematic view showing an example of a copy-protected image.
Figure 9:
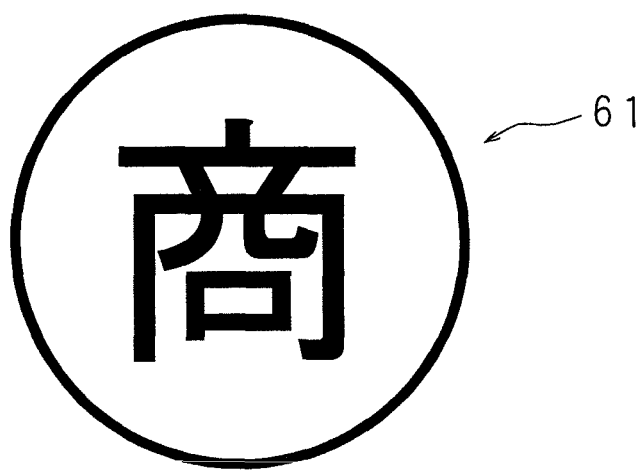
FIG. 9 is a schematic view showing an example of a distinguishing pattern.

FIG. 8 is a schematic view showing an example of the copy-protected image. FIG. 9 is a schematic view showing an example of the distinguishing pattern. In FIG. 8, a gift certificate is illustrated as an example of the copy-protected image, which contains the distinguishing pattern 61. As shown in FIG. 9, the distinguishing pattern is configured with a circled Chinese character representing the gift certificate. Plural kinds of copy-protected images may contain the common distinguishing pattern, or plural kinds of copy-protected images may contain distinctive distinguishing patterns, respectively. When a distinguishing pattern is contained in an image as shown in FIG. 9, the image can be determined as the copy-protected image. On the contrary, when such a distinguishing pattern is not contained in the image, the image can be determined as not the copy-protected image. It should be noted that the distinguishing pattern is not limited to the example shown in FIG. 9 and plural types of graphic forms may be set as the distinguishing pattern, such as a vermilion circle contained in a paper money.

Figure 11:
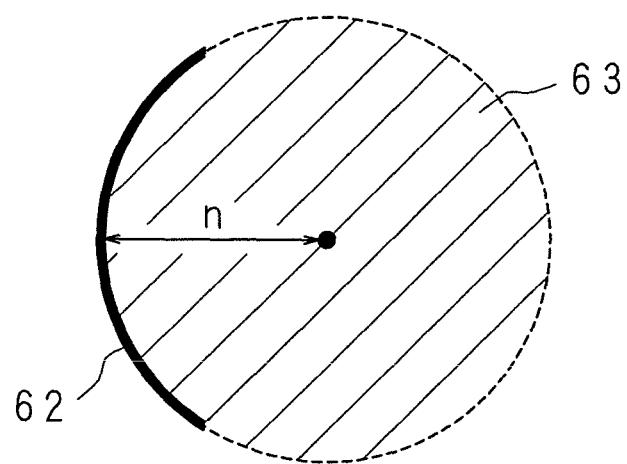
FIG. 11 is a schematic view showing an example of a distinguishing pattern candidate image.

FIG. 10 is a schematic view showing an example of a part pattern that is a part of the distinguishing pattern. The solid line part in FIG. 10 represents a part pattern 62 which is a part of circular arc contained in the distinguishing pattern 61 shown by FIG. 9. The broken line in FIG. 10 represents the part of distinguishing pattern 61 other than the part pattern 62. When the part pattern 62 is detected on the image, it is possible to extract a distinguishing pattern candidate image that must be the distinguishing pattern 61 with high possibility. FIG. 11 is a schematic view showing an example of the distinguishing pattern candidate image. The part pattern 62 in FIG. 11 is illustrated as a part of area surrounded by "n (mm)" radius circle. When the part pattern 62 is detected on the image, the distinguishing pattern 61 must be on the area surrounded by the "n (mm)" radius circle with high possibility. Thus, the distinguishing pattern candidate image 63 is considered on the circle area. In FIG. 11, the broken line represents a part of circle other than the part pattern 62 and the hatching represents the area of the distinguishing pattern candidate image 63. The other part patterns are also set for the other kinds of distinguishing patterns, respectively. It is preferable to utilize a graphic form, as the part pattern, which can be detected easily as shown in FIG. 10 and can easily lead recognizing the area of the distinguishing pattern candidate image 63 as shown in FIG. 11.

The distinguishing pattern detecting section 46 sets on the image a determination window that can contain whole of a part pattern, moves the determination window on the image and determines whether the determination window contains the part pattern or not, in order to detect the part pattern. FIG. 12 is a schematic view showing an example of the determination window. In the example of FIG. 12, the determination window 64 is illustrated to be a rectangular shape whose vertical direction represents the main-scanning direction and horizontal direction represents the sub-scanning direction of the read image by the first reading section 1 or the second reading section 2. The determination window 64 is illustrated to be able to contain whole of the part pattern 62. In FIG. 12, the part pattern 62 is illustrated to be contained within the determination window 64, in order to explain relationship between the size of determination window 64 and the part pattern 62. In the case that the part pattern is contained in the determination window 64 on an image represented by the binary image data being input from the distinctive color extracting section 45, the pixels of the distinctive color must be positioned on the part pattern and the other pixels of the indistinctive color must be positioned on the other area within the determination window 64. The distinguishing pattern detecting section 46 stores template 70 that sets the area size of determination window 64 based on the part pattern shape and sets regions divided from the determination window 64 for analyzing the distribution of distinctive color pixels.

Figure 13A:
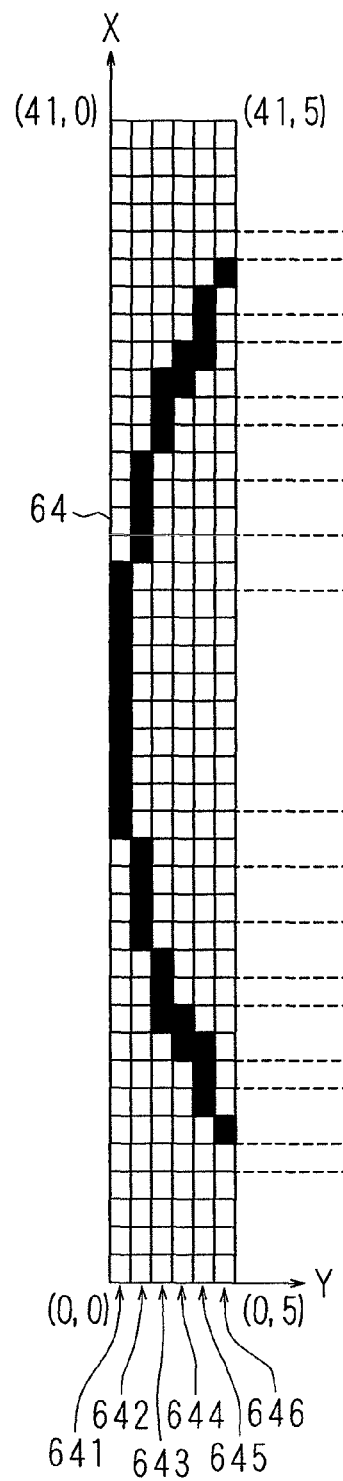
FIG. 13A and FIG. 13B are schematic views showing an example of templates.
Figure 13B:
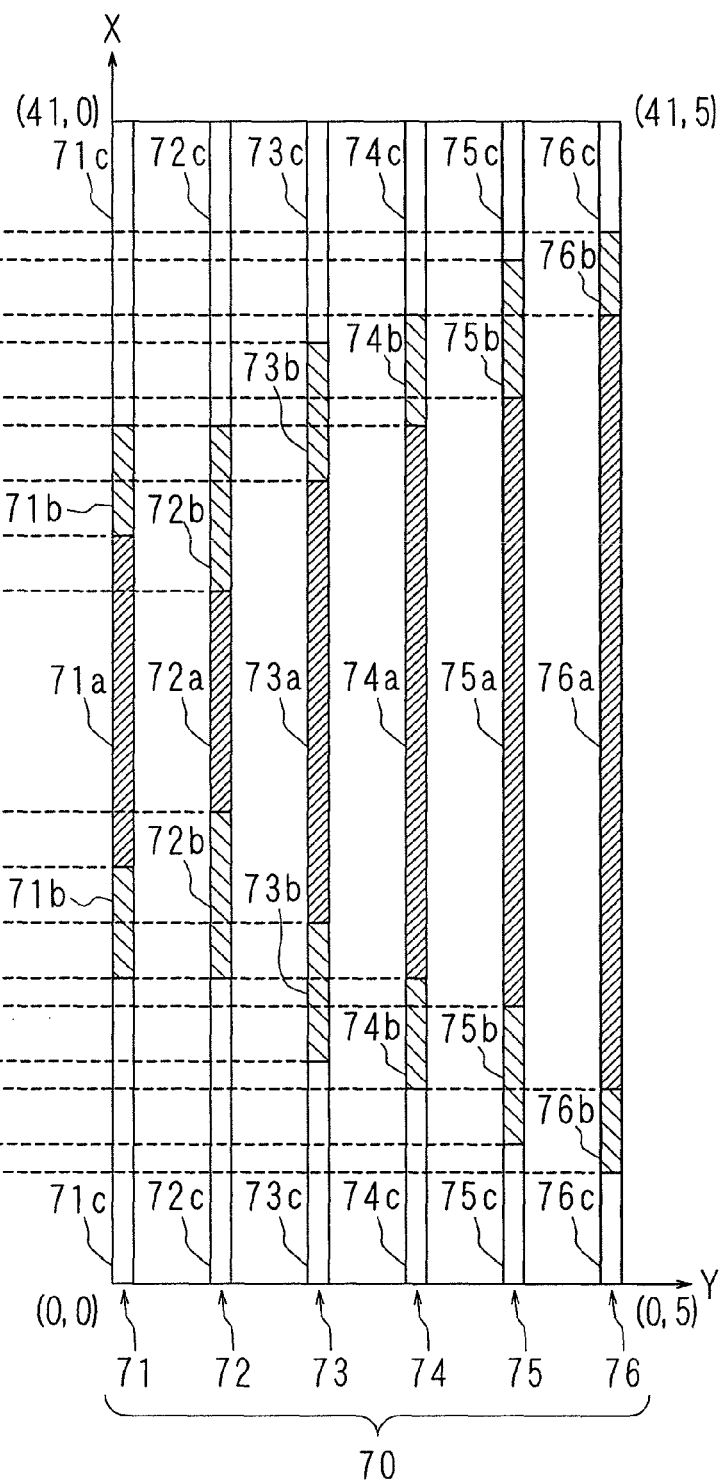

FIG. 13A and FIG. 13B are schematic views showing an example of the template 70. FIG. 13A illustrates a distribution of pixels in the case that the part pattern 62 is contained in the determination window 64. In the example of FIG. 13, the determination window 64 is configured with 6 line data (641, 642, 643, 644, 645 and 646) aligned in the sub-scanning direction. Each line data includes 42 pixels aligned in the main-scanning direction. In FIG. 13A, black cells represent the distinctive color pixels whose pixel values are "1", and white cells represent the indistinctive color pixels whose pixel values are "0". For example, the line data 641 has coordinates (0, 0)~(15, 0) and coordinates (26, 0)~(41, 0)

whose pixel values are "0", and coordinates (16, 0)~(25, 0) whose pixel values are "1" representing the distinctive color pixels.

In FIG. 13B, the template 70 is illustrated to show the relationships with the determination window 56 containing the part pattern 62. The template 70 is configured with: a first line 71 corresponding to the line data 641; a second line 72 corresponding to the line data 642; a third line 73 corresponding to the line data 643; a fourth line 74 corresponding to the line data 644; a fifth line 75 corresponding to the line data 645; and a sixth line 76 corresponding to the line data 646. The first to sixth lines are configured with 42 pixels aligned in the main-scanning direction and are divided into 3 regions, respectively. The first line 71 is divided into: a first region 71a from a coordinate (15, 0) to a coordinate (26, 0); second regions 71b, 71b from a coordinate (11, 0) to a coordinate (14, 0) and from a coordinate (27, 0) to a coordinate (30, 0); and third regions 71c, 71c from a coordinate (0, 0) to a coordinate (10, 0) and from a coordinate (31, 0) to a coordinate (41, 0). The second line 72 is divided into: a first region 72a from a coordinate (17, 1) to a coordinate (24, 1); second regions 72b, 72b from a coordinate (11, 1) to a coordinate (16, 1) and from a coordinate (25, 1) to a coordinate (30, 1); and third regions 72c, 72c from a coordinate (0, 1) to a coordinate (10, 1) and from a coordinate (31, 1) to a coordinate (41, 1). The third line 73 is divided into: a first region 73a from a coordinate (13, 2) to a coordinate (28, 2); second regions 73b, 73b from a coordinate (8, 2) to a coordinate (12, 2) and from a coordinate (29, 2) to a coordinate (33, 2); and third regions 73c, 73c from a coordinate (0, 2) to a coordinate (7, 2) and from a coordinate (34, 2) to a coordinate (41, 2). The fourth line 74 is divided into: a first region 74a from a coordinate (11, 3) to a coordinate (30, 3); second regions 74b, 74b from a coordinate (7, 3) to a coordinate (10, 3) and from a coordinate (31, 3) to a coordinate (34, 3); and third regions 74c, 74c from a coordinate (0, 3) to a coordinate (6, 3) and from a coordinate (33, 3) to a coordinate (41, 3). The fifth line 75 is divided into: a first region 75a from a coordinate (10, 4) to a coordinate (31, 4); second regions 75b, 75b from a coordinate (5, 4) to a coordinate (9, 4) and from a coordinate (32, 4) to a coordinate (36, 4); and third regions 75c, 75c from a coordinate (0, 4) to a coordinate (4, 4) and from a coordinate (37, 4) to a coordinate (41, 4). The sixth line 76 is divided into: a first region 76a from a coordinate (7, 5) to a coordinate (34, 5); second regions 76b, 76b from a coordinate (4, 5) to a coordinate (6, 5) and from a coordinate (35, 5) to a coordinate (37, 5); and third regions 76c, 76c from a coordinate (0, 5) to a coordinate (4, 5) and from a coordinate (38, 5) to a coordinate (41, 5).

As shown in FIG. 13A and FIG. 13B, the shape of determination window 64 is set to match the whole shape of template 70. In addition, each region within the template 70 is set in accordance with the distribution status of distinctive color pixels at the time when the part pattern 62 is contained into the determination window 64. Specifically, the first regions 71a18 76b and the second regions 71b~76b are areas on which the distinctive color pixels should be intensively positioned, and the other regions are areas on which almost all the distinctive color pixels should not positioned at the time when the part pattern 62 is contained into the determination window 64.

The distinguishing pattern detecting section 46 further stores pixel number range information for setting a range of distinctive color pixel number to be contained in each region at the time when the part pattern 62 is contained in the determination window 64. FIG. 14 is a table showing an example about the pixel number range. As distinctive color pixels are intensively positioned within the first region 71a of the first line 71 and the second region 72b of the second line 72 to the second region 76b of the sixth line 76 in the case that the part pattern 52 is contained within the determination window 64, the pixel number range is set to make these regions properly contain many distinctive color pixels. As distinctive color pixels are rarely positioned within the other regions in the case that the part pattern 52 is contained within the determination window 64, the pixel number range is set to make the other regions rarely contain distinctive color pixels. When the distinctive color pixel numbers match the pixel number range for the all regions being set by the template 70, it is determined that the part pattern is contained within the determination window 64. The distinguishing pattern detecting section 46 may store other template 70 and pixel number ranges for many kinds of distinguishing patterns.

The distinguishing pattern detecting section 46 sets positions in the main-scanning direction and in the sub-scanning direction of the determination window 64 within an image represented by the binary image data being input from the distinctive color extracting section 45, and further calculates the numbers of distinctive color pixel positioned in each region being set by the template 70 among the pixels contained within the determination window 64 on the image. Specifically, the distinguishing pattern detecting section 46 calculates the numbers of pixels whose pixel values are "1" among the pixels positioned within each region. The distinguishing pattern detecting section 46 then compares the calculated distinctive color pixel numbers for each region and the stored pixel number range information for each region, and determines that the part pattern 62 is detected in the case that the calculated distinctive color pixel numbers match with the stored pixel number range information for all the regions. On the contrary, the distinguishing pattern detecting section 46 determines that the part pattern 62 is not detected in the case that any of the calculated distinctive color pixel numbers do not match with the stored pixel number range information, shifts the determination window 64 for one pixel width in the main-scanning direction, and similarly performs the detection processing of the part pattern 62. In the case that the scanning in the main-scanning direction is ended without finding the part pattern 62, the distinguishing pattern detecting section 46 shifts the determination window 64 for one pixel width in the sub-scanning direction, and similarly performs the detection processing of the part pattern 62. In the case that the scanning in the whole image is ended without finding the part pattern 62, the distinguishing pattern detecting section 46 determines that the read image does not contain the distinguishing pattern.

When having detected the part pattern 62, the distinguishing pattern detecting section 46 extracts the distinguishing pattern candidate image 63 containing the part pattern 62 within the determination window 64 from the image represented by the binary image data. The distinguishing pattern detecting section 46 then determines whether the distinguishing pattern candidate image 63 is the distinguishing pattern or not based on distribution of the distinctive color pixels contained in the extracted distinguishing pattern candidate image 63. Specifically, the distinguishing pattern detecting section 46 divides the distinguishing pattern candidate image 63 into plural regions, and determines that the distinguishing pattern candidate image 63 is the distinguishing pattern in the case that the numbers of distinctive color pixels for each region fall within the predetermined range.

FIG. 15 is a schematic view showing an example about the distinguishing pattern candidate image divided into plural regions. In the example of FIG. 15, circular distinguishing pattern candidate image 63 is concentrically divided into the plural regions: a first divided region 631 inside a circle having the shortest radius; a second divided region 632 outside the circle and inside another circle having the second shortest radius; a third divided region 633 outside said another circle and inside other circle having the third shortest radius; and a fourth divided region 634 outside said other circle and inside the outer circle. The distinguishing pattern detecting section 46 stores the region setting data for setting the divided regions as shown in FIG. 15.

The distinguishing pattern detecting section 46 further stores distinctive color pixel number range information for setting the range of distinctive color pixel numbers for each region into which the distinguishing pattern is divided in accordance with the region setting data. FIG. 16 is a conceptual view showing an example about the distinctive color pixel number range. In FIG. 16, the range of distinctive color pixel numbers is illustrated to be: not less than 246 and not more than 300 for the first divided region 631; not less than 250 and not more than 302 for the second divided region 632; not less than 266 and not more than 310 for the third divided region 633; and not less than 480 for the fourth divided region 634. The example of FIG. 16 is according to the distinguishing pattern 61 shown in FIG. 6, and based on the numbers of distinctive color pixel positioned within each region divided as shown in FIG. 15. As described above, the region setting data and the distinctive color pixel number range are set in accordance with the distribution of distinctive color pixel contained in the distinguishing pattern. The distinguishing pattern detecting section 46 stores the region setting data and the distinctive color pixel number range information for many kinds of distinguishing patterns.

The distinguishing pattern detecting section 46 divides the distinguishing pattern candidate image 63 into the plural divided regions being set by the region setting data, and then calculates the numbers of distinctive color pixels positioned within each divided region. Specifically, the distinguishing pattern detecting section 46 calculates the numbers of pixels whose pixel values are "1" among the pixels positioned within each divided region. The distinguishing pattern detecting section 46 then compares the calculated distinctive color pixel numbers for each divided region with the pixel number range for each divided region being set by the distinctive color pixel number range information, and determines that the distinguishing pattern 61 is detected in the case that the calculated distinctive color pixel numbers match with the pixel number range for all the divided regions. On the contrary, the distinguishing pattern detecting section 46 determines that the distinguishing pattern 61 is not detected in the case that any of the calculated distinctive color pixel numbers do not match with the pixel number range. The distinguishing pattern detecting section 46 then outputs the determination results to the CPU 51.

In the case that the detection processing is performed for plural distinguishing patterns each of which has a common part pattern 62, such as distinguishing patterns each of which is configured with a distinctive character in the common circle, the distinguishing pattern detecting section 46 repeats the detection processing of the distinguishing pattern at the same times as the numbers of distinguishing pattern common for the detected part pattern 62. Further, the distinguishing pattern detecting section 46 repeats the detection processing of the distinguishing pattern for each of plural kinds of distinguishing patterns. Alternatively, the distinguishing pattern detecting section 46 may be connected to each distinctive color extracting section 45 arranged in parallel, and each distinguishing pattern detecting section 46 may perform the detection processing of the distinguishing pattern based on the binary image data being output by each distinctive color extracting section 45.

The CPU 51 controls image processing on image data in accordance with the determination results being output by the distinguishing pattern detecting section 46. Specifically, when the output determination results indicate that the distinguishing pattern is not contained in the image read by the first reading section 1 or the second reading section 2, the CPU 51 stores the image data being output by the image quality improving section 47 onto the RAM 53, and externally transmits the image data through the transmitting section 58. On the contrary, when the output determination results indicate that the distinguishing pattern is contained in the image read by the first reading section 1 or the second reading section 2, the CPU 51 performs the prohibitive processing that prohibits the image quality improving section 47 from externally outputting the output image data through the transmitting section 58. At that time, the CPU 51 performs processing for displaying notification information about the output prohibition of image data on the displaying section 54.

As described above, the image reading apparatus according to the present invention actually reads the standard chart and then calculates the gamma correction values and the color factors of color correction based on the read standard chart. Furthermore, the image reading apparatus compares the read values based on the read actual standard chart with the target values based on the sample data stored on the storing section 57, and then performs processing for deciding the distinctive color range to be stored on the setting register 452.

Figure 17:
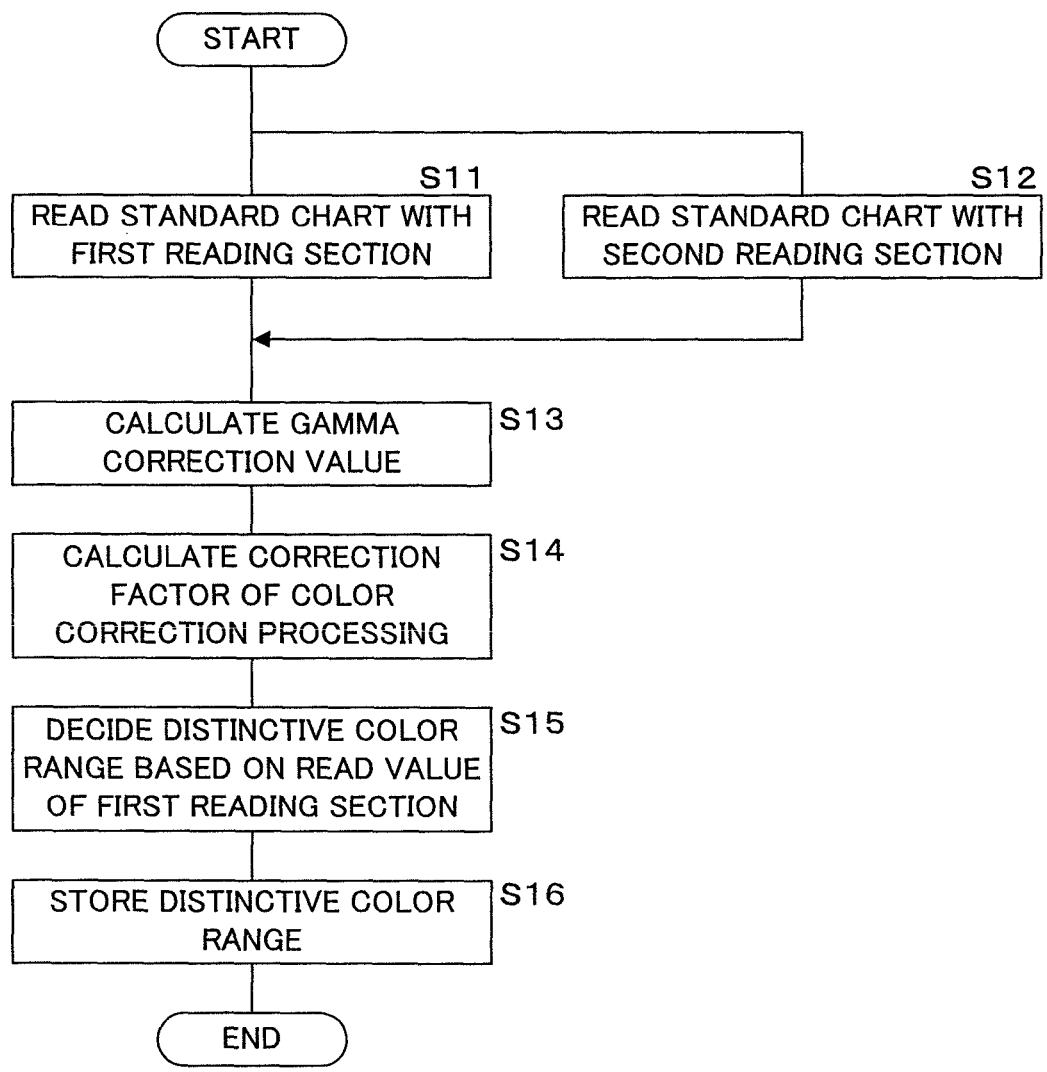
FIG. 17 is a flowchart showing a procedure for calculating the gamma correction value and the correction factor of color correction and for setting a distinctive color range in the image reading apparatus according to embodiment 1.

FIG. 17 is a flowchart showing a procedure for calculating the gamma correction values and the correction factors of color correction and for setting the distinctive color range in the image reading apparatus according to embodiment 1. The image reading apparatus reads out the standard chart whose both surfaces record images, and then performs processing based on the read images. The first reading section 1 reads out the standard chart (S11), and the read image is utilized even for the shading correction processing performed by the shading correcting section 413. In parallel, the second reading section 2 reads the standard chart (S12), and the read image is utilized even for the shading correction processing performed by the shading correcting section 423. The controlling section 56 generates respective read values for RGB signals for each color patch in the standard charts read by the first reading section 1 and the second reading section 2, and then calculates the gamma correction values for the read values of the image read by the first reading section 1 as well as the gamma correction values for the read values of the image read by the second reading section 2 (S13), with utilizing the method described above. Not only the gamma correcting section 414 but also the gamma correcting section 424 stores the LUT representing the relationships between the read values of the RGB signals and the gamma correction values, and performs the gamma correction processing. The controlling section 56 then calculates the correction factors utilized in the color correction processing for the read values of image read by the first reading section 1 and the correction factors utilized in the color correction processing for the read values of image read by the second reading section 2 (S14), with the read values on which the gamma correction processing are performed respectively by the gamma correcting section 414 and the gamma correcting section 424 and the target values of RGB signals, and with the method described above. The color correcting section 415 as well as the color correcting section 425 stores the calculated correction factors and performs the color correction processing, respectively.

The controlling section 56 then decides the distinctive color range for storing the distinctive color range information on the setting register 452 based on the read values of standard chart being read by the first reading section 1 (S15). In this embodiment, default values are stored for the distinctive color range, in advance. The default values are defined to correspond with the target values that are values of RGB signals obtained by reading the standard chart in the ideal condition. In other words, the default values of the distinctive color range should be defined in accordance with the differences between the target values and the read values of RGB signals. For example, the controlling section 56 compares the read values of RGB signals on which the color correcting section 415 has performed the color correction processing and the target values of RGB signals which are contained in the sample data at the Step S15, for adjusting the distinctive color range corresponding with the target values in order to correspond with the read values. Then, the controlling section 56 obtains a mathematical function for converting the target value of R signal ($R_{target}$) into the read value. As having been stored on the setting register 452 or the storing section 57 previously, the lower limit $R_{min}$ and the upper limit $R_{max}$ of R signal within the distinctive color range are set in accordance with the target value $R_{target}$. Thus, it is possible to obtain the $R_{min}$ and the $R_{max}$ corresponding to the read values by substituting the default values of the $R_{min}$ and the $R_{max}$ into the obtained mathematical function. As described above, the controlling section 56 calculates the $R_{min}$ and the $R_{max}$ corresponding to the read values. Furthermore, the controlling section 56 similarly calculates the $G_{min}$, the $G_{max}$, the $B_{min}$, the $B_{max}$, the $(G-R)_{min}$, the $(G-R)_{max}$, the $(G-B)_{min}$, the $(G-B)_{max}$, the $(R-B)_{min}$, and the $(R-B)_{max}$, in order to decide the distinctive color range. The controlling section 56 then stores the decided distinctive color range on the setting register 452 (S16), and completes the procedure.

As the gamma correction values and the correction factors of color correction processing are calculated on the basis of the standard chart in the procedure described above, this procedure is performed in order to decide the distinctive color range at the time of manufacture of image reading apparatus. In this embodiment, it is described about the procedure for reading the standard chart whose both surfaces record images. However, it may be possible alternatively for the image reading apparatus to read the standard chart, whose one of surfaces records the image, through the first reading section 1 and the second reading section 2 sequentially. At the Step S15, the distinctive color range may be decided on the basis of the read values that are obtained from the standard chart being read by the second reading section 2, alternatively. The image reading apparatus may be configured to perform the procedure described above as appropriate, at the time of maintenance, such as adjusting or replacing the optical systems of the first reading section 1 and the second reading section 2.

Figure 18:
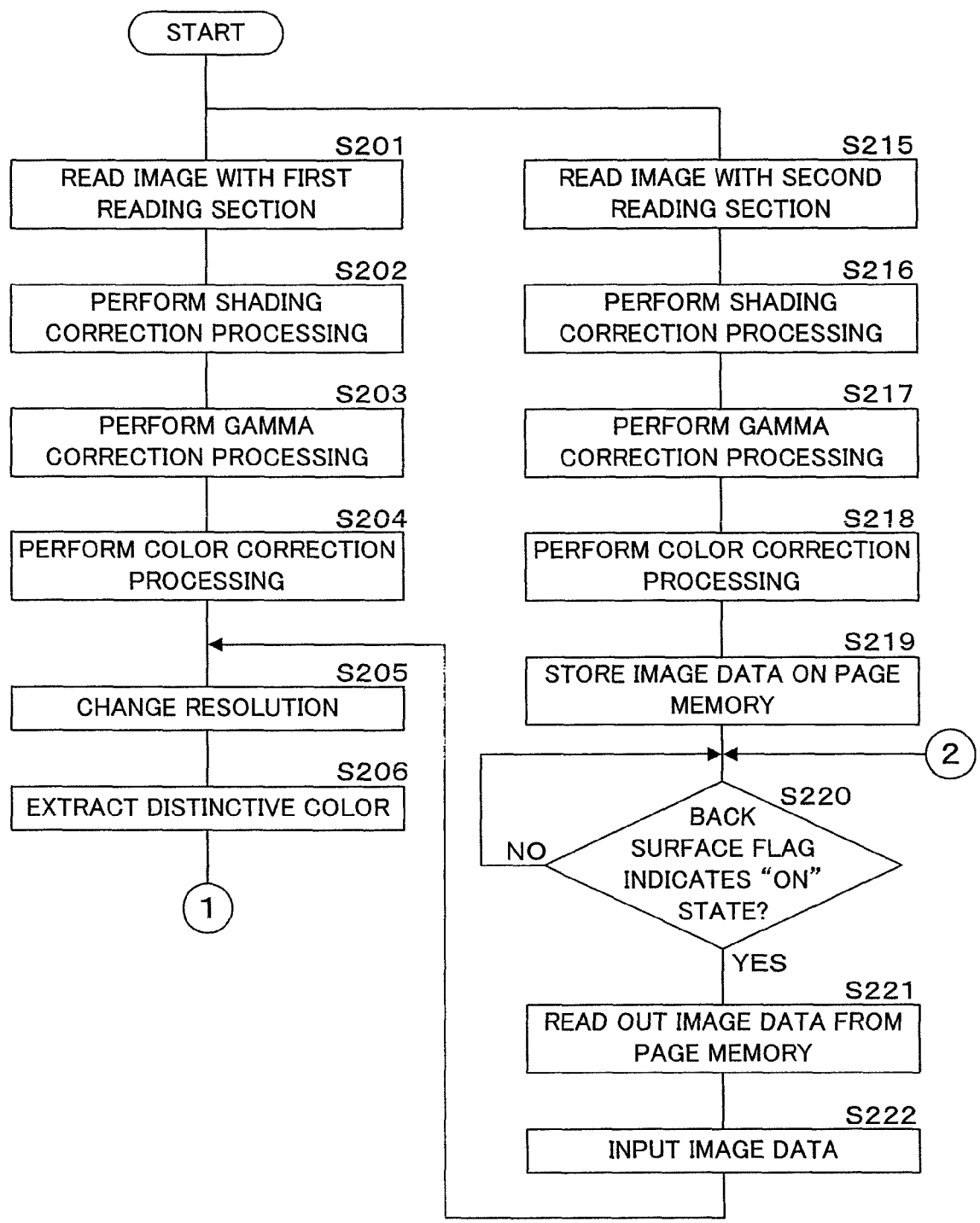
FIG. 18 is a flowchart showing a procedure for reading images recorded on both surfaces of a document in the image reading apparatus according to the embodiment 1.
Figure 19:
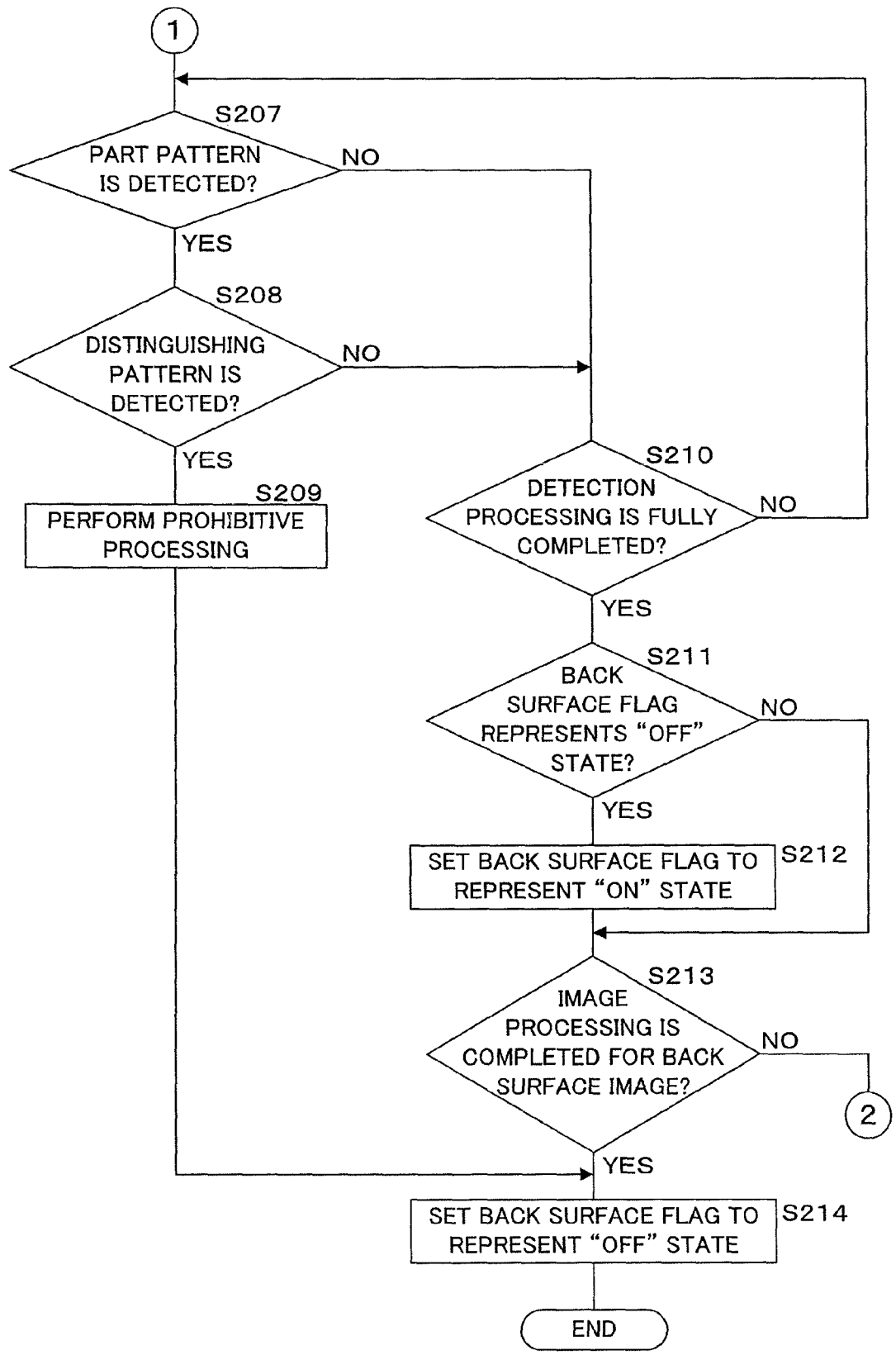
FIG. 19 is a flowchart showing a procedure for reading images recorded on both surfaces of the document in the image reading apparatus according to the embodiment 1.

Next, it will be described about the procedure for reading images by the image reading apparatus according to the present invention. FIG. 18 and FIG. 19 are flowcharts showing the procedure for reading images recorded on both surfaces of a document in the image reading apparatus according to the embodiment 1. As performed in the image determining section 40 and in the image quality improving section 47 described above, the image processing is performed on the image data of image read by the second reading section 2 after the image processing is performed on the image data of image read by the first reading section 1. The controlling section 56 stores a back surface flag representing that the image processing has been completed for the image being read by the first reading section 1 and that another image processing can be started for the image being read by the second reading section 2, although the surface flag is set to be "off" state in normal status.

The image reading apparatus starts processing for reading images recorded on the both surfaces of the document. The first reading section 1 reads the image on the single surface (S201), the shading correction 413 performs the shading correction processing (S202), the gamma correction section 414 performs the gamma correction processing (S203), and the color correcting section 415 performs the color correction processing (S204). The color correcting section 415 inputs the image data, on which the color correction processing has been performed, into the image determining section 40 and into the image quality improving section 47. In parallel, the second reading section 2 reads the image on the other surface (S215), the shading correcting section 423 performs the shading correction processing (S216), the gamma correcting section 424 performs the gamma correction processing (S217), and the color correcting section 425 performs the color correction processing (S218). The memory controlling section 426 stores the image data, on which the color correction processing has been performed, onto the page memory 427 (S219), reads out the back surface flag from the controlling section 56, and determines whether the surface flag indicates "on" state or not (S220). When having determined that the back surface flag indicates the "off" state (S220: NO), the memory controlling section 426 waits until the back surface flag indicates the "on" state with keeping the image data stored on the page memory 427.

After being input into the image determining section 40, the image data is input into the resolution changing section 43. The resolution changing section 43 changes the resolution of the input image data with the method described above (S205), the color difference calculating section 44 calculates the differences of RGB signals with the method described above, and the distinctive color extracting section 45 extracts the distinctive color with the method described above (S206). The distinctive color extracting section 45 inputs the binary image data into the distinguishing pattern detecting section 46 at the Step S206, as described above. The distinguishing pattern detecting section 46 performs the detection processing of the part pattern on the image represented by the binary image data with the method described above (S207). When having detected the part pattern (S207: YES), the distinguishing pattern detecting section 46 extracts the distinguishing pattern candidate image containing the detected part pattern with the method described above, and performs the detection processing of the distinguishing pattern on the distinguishing pattern candidate image (S208). When having detected the distinguishing pattern (S208: YES), the distinguishing pattern detecting section 46 inputs the determination results into the CPU 51. As the input determination results indicate that the distinguishing pattern is contained in the read image, the CPU 51 prohibits outputting the image data (S209).

When the part pattern cannot be detected at the Step S207 (S207: NO) or the distinguishing pattern cannot be detected at the Step S208 (S208: NO), the distinguishing pattern detecting section 46 determines whether the detection processing has been completed on the whole image represented by the binary image data for all kinds of distinguishing patterns to be detectable or not (S210). When having determined that the detection processing has not been fully completed (S210: NO), the distinguishing pattern detecting section 46 returns the procedure to the Step S207 and performs the remaining procedure. When the distinguishing pattern detecting section 46 has determined that the detection processing has been properly completed (S210: YES), the controlling section 56 determines whether the back surface flag represents the "off" state or not (S211). When having determined that the back surface flag represents the "off" state (S211: YES), the controlling section 56 sets the back surface flag to represent "on" state (S212). When the Step S212 has been completed or the controlling section 56 has determined that the back surface flag represents the "on" state (S211: NO), the controlling section 56 determines whether the image processing is completed for the image on the back surface read by the second reading section 2 or not (S213). When having determined that the image processing is not completed for the back surface image (S213: NO), the controlling section 56 proceeds the procedure to the Step S220.

When the back surface flag indicates the "on" state at the Step S220 (S220: YES), the memory controlling section 426 reads out image data from the page memory 427 (S221), and inputs the read image data into the image determining section 40 and into the image quality improving section 47 (S222). The image determining section 40 repeats the procedure downstream from the Step S205, in order to determine whether the distinguishing pattern is contained in the image being read by the second reading section 2 or not.

After the Step S209 is completed or the image processing is completed for the back surface image at the Step S213 (S213: YES), the controlling section 56 sets the back surface flag to indicate the "off" state (S214) and the procedure is completed. In the case that the distinguishing pattern is not contained in the images being read by the first reading section 1 and by the second reading section 2, the CPU 51 can perform additional processing, such as outputting the image data through the transmitting section 58.

As described above, the image reading apparatus according to the present invention compares the results of standard chart read by the first reading section 1 and by the second reading section 2 with the sample data, and sets the gamma correction values and correction factors of the color correction processing for the respective images read by the first reading section 1 and by the second reading section 2, to make the colors of standard charts being read by the first reading section 1 and by the second reading section 2 become close to the colors represented by the sample data as much as possible. Therefore, the image being read from the surface of the document by the first reading section 1 is substantially the same in the illuminance and the chromaticity as the image being read from the other surface of the document by the second reading section 2. In other words, the brightness distribution and the color balance are substantially the same on the two images generated in response to reading both surfaces of the document. Assume that the same image is read by the first reading section 1 and by the second reading section 2. In this assumption, almost the same two image data are obtained. Since the distinctive color contained in the image being read by the first reading section 1 becomes the same as the distinctive color contained in the image being read by the second reading section 2 in this assumption, it is possible to share the distinctive color range required for detecting the distinguishing pattern on the read images generated from the both surfaces. As described above, the image reading apparatus according to the present invention can utilize the shared common parameters for detecting the distinguishing pattern on the images obtained in response to reading both surfaces of document. Thus, it does not require re-setting the parameter during the image processing. In other words, it is possible to execute the image reading processing without reducing performances of the image reading apparatus. Furthermore, even if a cheap low speed circuit is provided for detecting the distinguishing pattern, it is less likely to cause decreasing performances of the image reading apparatus. Therefore, it is possible to save costs of the image reading apparatus by providing the cheap circuit, with inhibiting the decrease of performance.

In the image reading apparatus according to the present invention, the image determining section 40 performs the detection processing of the distinguishing pattern on the image being read by the first reading section 1, and sequentially performs the detection processing of the distinguishing pattern on the image being read by the second reading section 2 after completing the detection processing for the first reading section 1. The image reading apparatus according to the present invention can utilize the shared common parameter for detecting the distinguishing pattern on the images obtained in response to reading both surfaces of document. Thus, the image determining section 40 can execute the image reading processing for both surfaces of document sequentially, without decreasing performances of the image reading apparatus. It is possible to inhibit image reading apparatus from decreasing the performances, even without providing plural image determining sections 40. Therefore, it is possible to simplify the configurations and to save the costs of the image reading apparatus.

(Embodiment 2)

Figure 20:
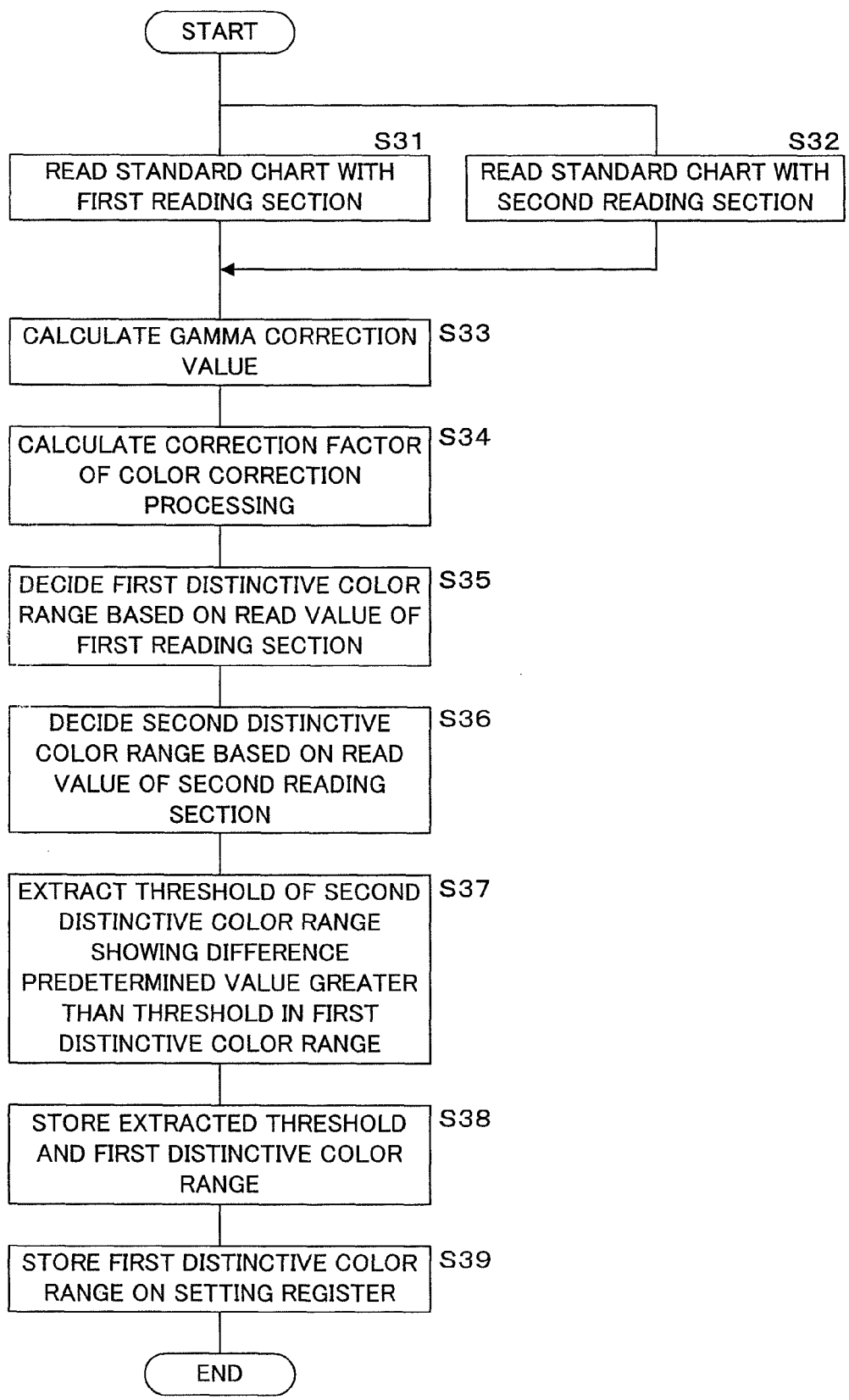
FIG. 20 is a flowchart showing a procedure for calculating the gamma correction value and the correction factor of color correction and for setting a distinctive color range in the image reading apparatus according to embodiment 2.

Configurations of the image reading apparatus according to embodiment 2 are similar to those of embodiment 1, and the explanations are omitted for the configurations of embodiment 2. FIG. 20 is a flowchart showing a procedure for calculating the gamma correction values and the correction factors of color correction and for setting the distinctive color range in the image reading apparatus according to the embodiment 2. The image reading apparatus reads the standard chart, which has images recorded on the both surfaces, and performs image processing based on the read images. The first reading section 1 reads the standard chart (S31) and the second reading section 2 reads the standard chart, in parallel (S32). The controlling section 56 then calculates the gamma correction values for the read values of image being read by the first reading section 1 and the gamma correction values for the read values of image being read by the second reading section 2, with the method similar in embodiment 1 (S33). Not only the gamma correcting section 414 but also the gamma correcting section 424 stores the LUT representing the relationships between the read values of the RGB signals and the gamma correction values. The controlling section 56 then calculates the correction factors of color correction processing for the read values of image being read by the first reading section 1 and the correction factors of color correction processing for the read values of image being read by the second reading section 2, with the method similar in the embodiment 1 (S34). The color correcting section 415 and the color correcting section 425 store the calculated correction factors, respectively.

The controlling section 56 calculates with the method similar in the embodiment 1 and decides the distinctive colorfirst distinctive color range to be stored on the setting register 452 of the distinctive color extracting section 45 based on the read values of standard chart being read by the first reading section 1 (S35). The controlling section 56 then performs calculation with the method similar at the Step S35, and decides the second distinctive color range to be stored on the setting register 452 of the distinctive color extracting section 45 based on the read values of standard chart being read by the second reading section 2 (S36). Specifically, the controlling section 56 calculates the $R_{min}$, the $R_{max}$, the $G_{min}$, the $G_{max}$, the $B_{min}$, the $B_{max}$, the $(G-R)_{min}$, the $(G-R)_{max}$, the $(G-B)_{min}$, the $(G-B)_{max}$, the $(R-B)_{min}$, and the $(R-B)_{max}$ based on the read values of standard chart being read by the second reading section 2, in order to decide the second distinctive color range.

The controlling section 56 compares thresholds in the first distinctive color range and thresholds in the second distinctive color range, and extracts thresholds of the second distinctive color range which shows a difference a predetermined value greater than the threshold in the first distinctive color range (S37). For example, in the case that there is the difference between the $R_{min}$ in the first distinctive color range and the $R_{min}$ in the second distinctive color and the difference is greater than the predetermined value, the $R_{min}$ in the second interest range is extracted from the thresholds in the second distinctive color range. The controlling section 56 then stores the threshold extracted from the second distinctive color range and further stores the first distinctive color range (S38). The controlling section 56 stores the first distinctive color range as the distinctive color range to be utilized by the distinctive color extracting section 45 onto the setting register 452 (S39), and completes the procedure. At the Step S39, the first distinctive color range is set as the range to be utilized by the distinctive color extracting section 45 in accordance with the read values of image being read by the first reading section 1.

Figure 21:
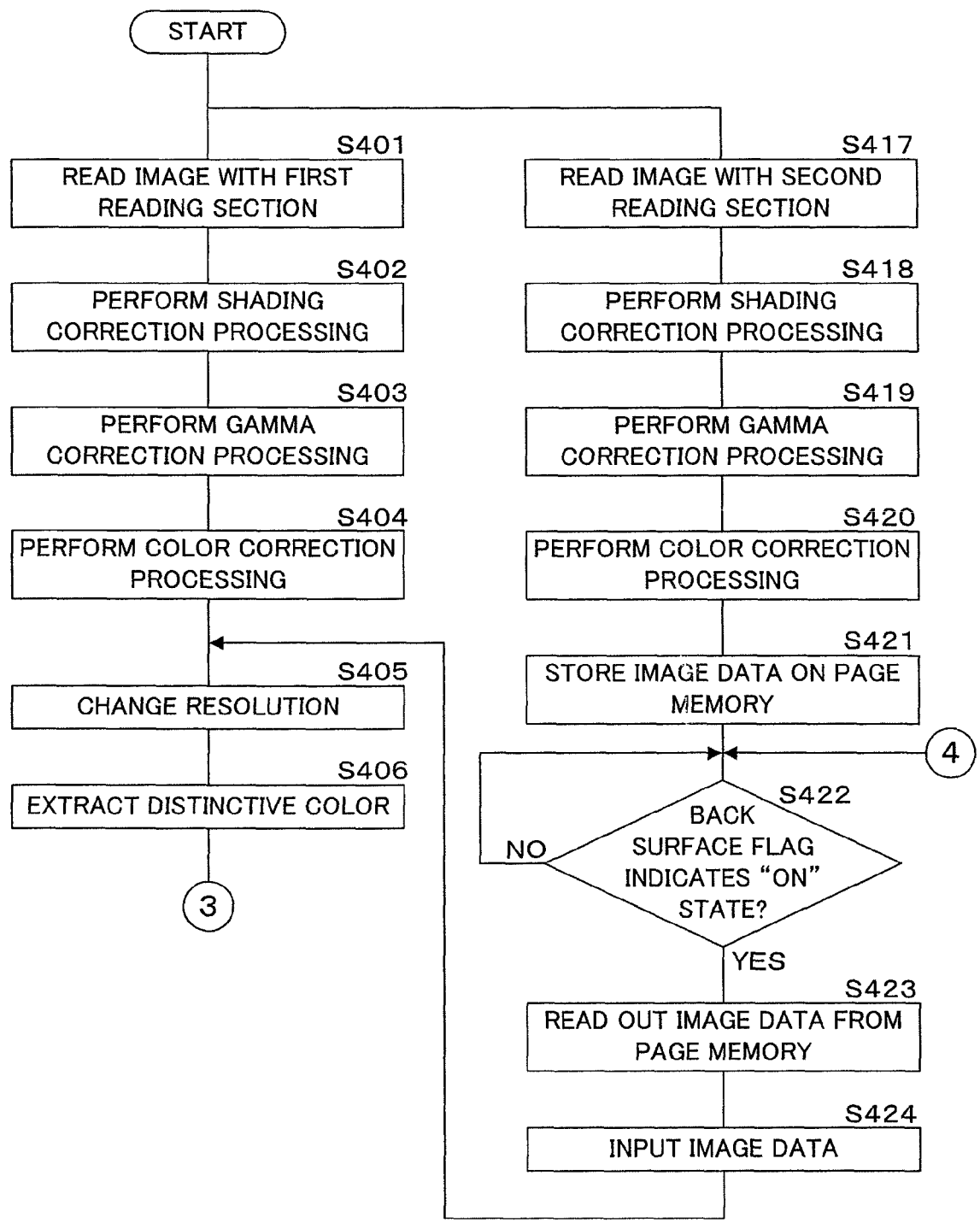
FIG. 21 is a flowchart showing a procedure for reading images recorded on both surfaces of a document in the image reading apparatus according to the embodiment 2.
Figure 22:
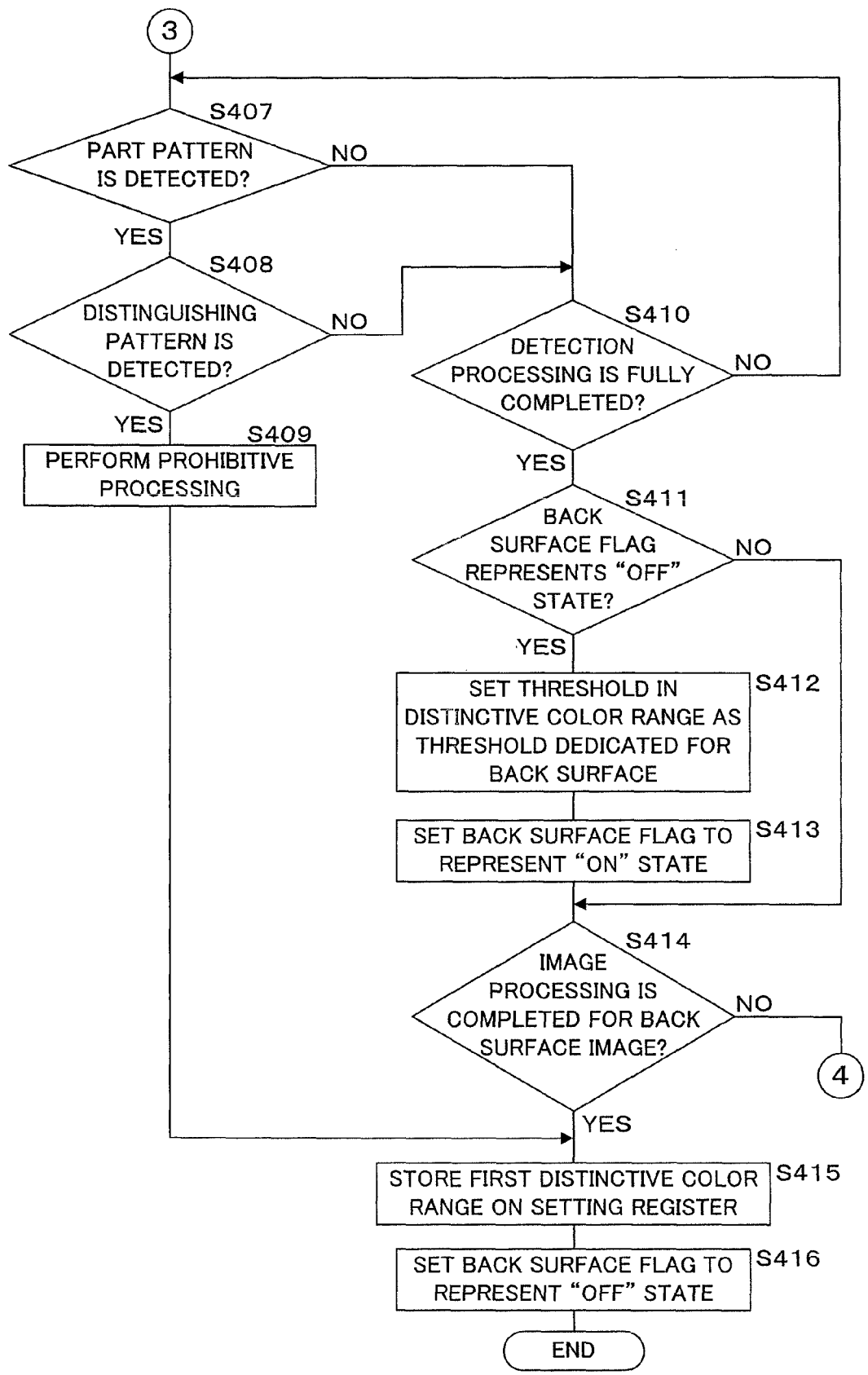
FIG. 22 is a flowchart showing a procedure for reading images recorded on both surfaces of the document in the image reading apparatus according to the embodiment 2.

FIG. 21 and FIG. 22 are flowcharts showing a procedure for reading images recorded on both surfaces of a document in the image reading apparatus according to the embodiment 2. The controlling section 56 stores the back surface flag that is set to be "off" state in normal condition. The image reading apparatus starts reading images recorded on the both surfaces of document, and performs processes at the Step S401 to the Step S404. These processes at the Step S401 to the Step S404 are similar to those of embodiment 1 at the Step S201 to the Step S204. In parallel, the image reading apparatus performs the processes at the Step S417 to the Step S422. These processes at the Step S417 to the Step S422 are similar to those of embodiment 1 at the Step S215 to the Step S220.

After the image data is input into the image determining section 40, the image reading apparatus performs the processes at the Step S405 to the Step S411. These processes at the Step S405 to the Step S411 are similar to those of embodiment 1 at the Step S205 to the Step S211. When the back surface flag is set to be "off" state at the Step S411 (S411: YES), the controlling section 56 sets the threshold extracted from the second distinctive color range at the Step S37 and stored at the Step S38, as the threshold dedicated for the back surface, among the thresholds in the distinctive color range stored on the setting register 452 (S412). For example, in the case that the $R_{min}$ is extracted from the second distinctive color range and stored, the $R_{min}$ in the distinctive color range stored on the setting register 452 is replaced with the $R_{min}$ extracted from the second distinctive color range. At the Step S412, the distinctive color range is set to be configured with thresholds in the first distinctive color range whose differences are less than a predetermined value from the second distinctive color range and thresholds in second distinctive color range whose differences are not less than a predetermined value from the first distinctive color range, as the distinctive color range is utilized for determining whether the distinguishing pattern is contained in the back surface image being read by the second reading section 2 or not.

After the Step S412, the controlling section 56 sets the back surface flag to be "on" state (S413). In the case that the Step S413 is completed or the back surface flag is set to be "on" state at the Step S411 (S411: NO), the controlling section 56 determines whether image processing is completed on the back surface image being read by the second reading section 2 or not (S414). When having determined that the image processing is not completed on the back surface image yet (S414: NO), the controlling section 56 proceeds the procedure to the Step S422. In the case that the back surface flag is set to be "on" state at the Step S422 (S422: YES), the memory controlling section 426 performs processes at the Step S423 and the Step S424. These processes at the Step S423 and the Step S424 are similar to those of embodiment 1 at the Step S221 and the Step S222. After the Step S424, the image determining section 40 performs the procedure downstream from the Step S405. Thus, it is possible to determine whether the distinguishing pattern is contained in the image being read by the second reading section 2 or not.

In the case that the Step S409 is completed or it is determined at the Step S414 that the image processing has completed on the back surface image (S414: YES), the controlling section 56 stores the first distinctive color range on the setting register 425 as the distinctive color range utilized by the distinctive color extracting section 45 (S415). The controlling section 56 then sets the back surface flag to be "off" state (S416) and completes the procedure.

As described above, the image reading apparatus according to the embodiment 2 calculates the first distinctive color range based on the standard chart being read by the first reading section 1 and calculates the second distinctive color range based on the standard chart being read by the second reading section 2. The image reading apparatus utilizes the first distinctive color range as the distinctive color range required for detecting the distinguishing pattern on the image being read by the first reading section 1. Further, the image reading apparatus utilizes the distinctive color range configured with the thresholds in the first distinctive color range whose differences are less than a predetermined value from the second distinctive color range and the thresholds in second distinctive color range whose differences are not less than a predetermined value from the first distinctive color range, as the distinctive color range required for detecting the distinguishing pattern on the image being read by the second reading section 2.

For exactly matching the brightness distribution and the color balance in the image being read by the first reading section 1 with those in the image being read by the second reading section 2, high performance is required in the gamma correcting sections 414 and 424, the color correcting sections 415 and 425, the first reading section 1 and the second reading section 2. These requirements cause high cost of the image reading apparatus. In this embodiment, the thresholds in the second distinctive color range, i.e., the thresholds having large differences between the first distinctive color range and the second distinctive color range, are utilized for detecting the distinguishing pattern on the image being read by the second reading section 2. Thus, even in the case that the brightness distributions and the color balances in the images on both surfaces cannot be matched exactly, it is possible to detect distinguishing pattern on the image being read by the second reading section 2, with similar accuracy to the detection on the image being read by the first reading section 1. Therefore, it is possible to save the cost of image reading apparatus.

In this embodiment, the thresholds in the first distinctive color range, i.e., the thresholds having small differences between the first distinctive color range and the second distinctive color range, are utilized for detecting the distinguishing pattern on the image being read by the second reading section 2. Thus, it is possible to reduce the number of parameters to be re-set during image processing. Therefore, it is possible to inhibit the image reading apparatus from decreasing the performance.

(Embodiment 3)

Figure 23:
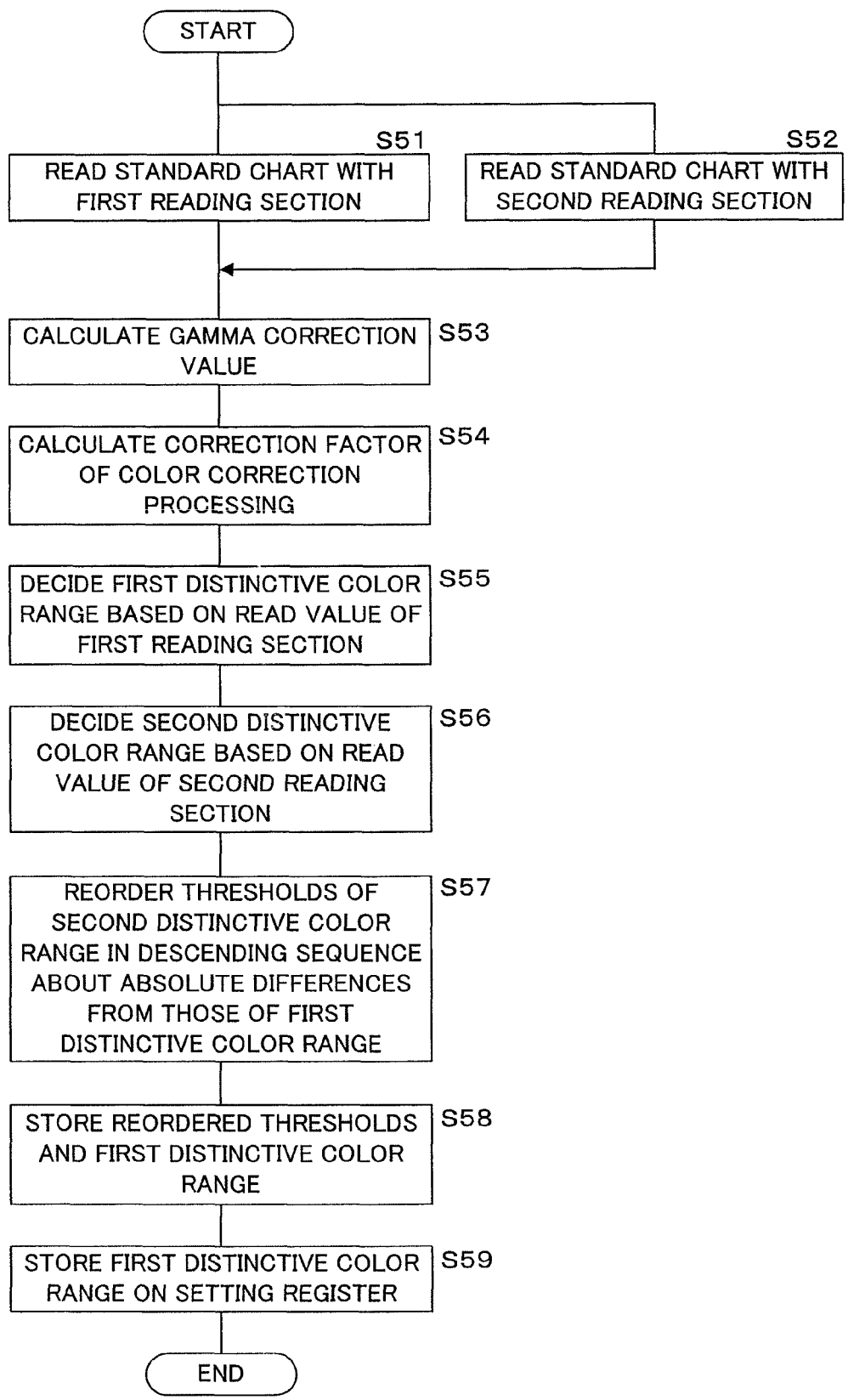
FIG. 23 is a flowchart showing a procedure for calculating the gamma correction value and the correction factor of color correction and for setting a distinctive color range in the image reading apparatus according to embodiment 3.

Configurations of the image reading apparatus according to embodiment 3 are similar to those of embodiment 1, and the explanations are omitted for the configurations of embodiment 3. FIG. 23 is a flowchart showing a procedure for calculating the gamma correction values and the correction factors of color correction and for setting the distinctive color range in the image reading apparatus according to embodiment 3. The image reading apparatus reads the standard chart that has images recorded on the both surfaces, and performs image processing based on the read images. The image reading apparatus performs processes at the Step S51 to the Step S56. These processes at the Step S51 to the Step S56 are similar to those of embodiment 2 at the Step S31 to the Step S36. The controlling section 56 compares thresholds in the first distinctive color range with thresholds in the second distinctive color range, reorders the thresholds of second distinctive color range in the descending sequence about absolute differences from the thresholds of the first distinctive color range (S57). The controlling section 56 stores the reordered thresholds of the second distinctive color range, and stores the first distinctive color range (S58). The controlling section 56 then stores the first distinctive color range on the setting register 452 as the distinctive color range utilized by the distinctive color extracting section 45 (S59), and completes the procedure. At the Step S59, the first distinctive color range is set as the range to be utilized by the distinctive color extracting section 45 in accordance with the read values of image being read by the first reading section 1.

Figure 24:
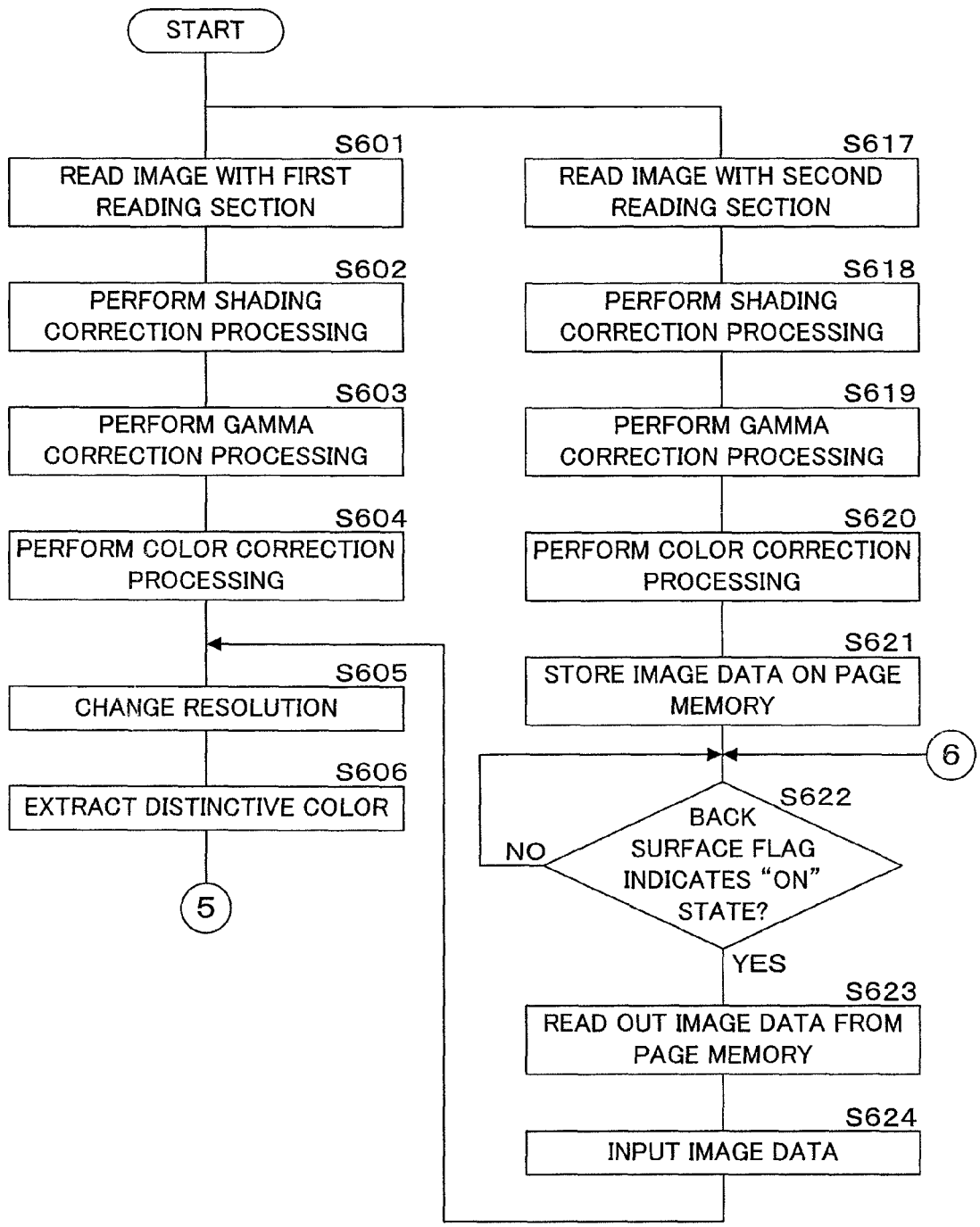
FIG. 24 is a flowchart showing a procedure for reading images recorded on both surfaces of a document in the image reading apparatus according to the embodiment 3.
Figure 25:
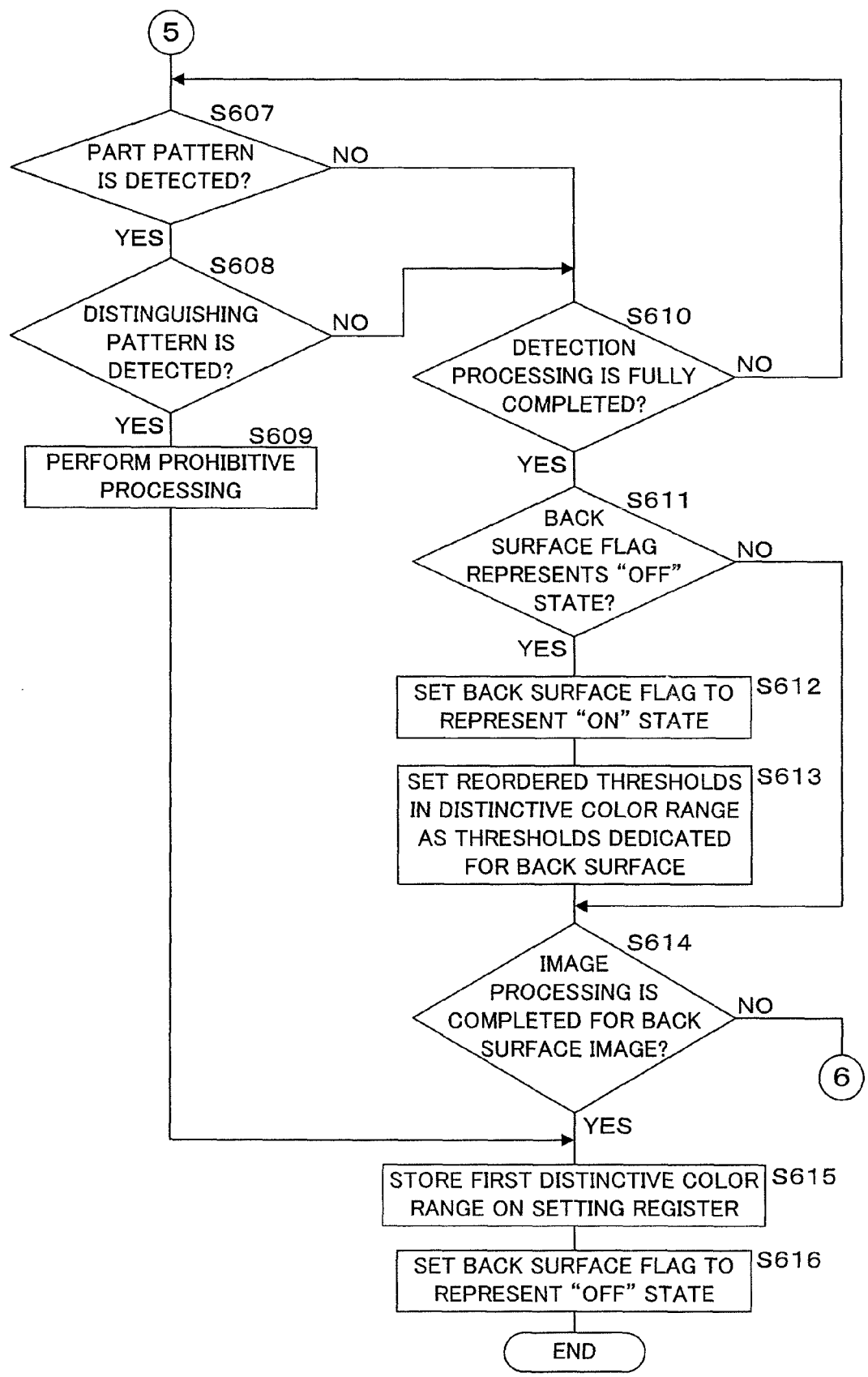
FIG. 25 is a flowchart showing a procedure for reading images recorded on both surfaces of the document in the image reading apparatus according to the embodiment 3.

FIG. 24 and FIG. 25 are flowcharts showing a procedure for reading images recorded on both surfaces of a document in the image reading apparatus according to the embodiment 3. The controlling section 56 stores the back surface flag that is set to be "off" state in normal condition. The image reading apparatus starts reading images recorded on the both surfaces of document, and performs processes at the Step S601 to the Step S604. These processes at the Step S601 to the Step S604 are similar to those of embodiment 1 at the Step S201 to the Step S204. In parallel, the image reading apparatus performs the processes at the Step S617 to the Step S622. These processes at the Step S617 to the Step S622 are similar to those of embodiment 1 at the Step S215 to the Step S220.

After the image data is input into the image determining section 40, the image reading apparatus performs the processes at the Step S605 to the Step S611. These processes at the Step S605 to the Step S611 are similar to those of embodiment 1 at the Step S205 to the Step S211. When the back surface flag is set to be "off" state at the Step S611 (S611: YES), the controlling section 56 sets the back surface flag to be "on" state (S612). The controlling section 56 then sets the thresholds of the distinctive color range stored on the setting register 453 with the descending sequence reordered at the Step S58, as the threshold dedicated for the back surface (S613). At the Step S613, the thresholds of the second distinctive color range are set in the descending sequence about the absolute difference from the thresholds of the first distinctive color range, as the thresholds of the distinctive color range utilized for determining whether the distinguishing pattern is contained in the back surface image being read by the second reading section 2 or not.

In parallel with the Step S613, the memory controlling section 426 performs processes at the Step S623 and the Step S624. These processes at the Step S623 and the Step S624 are similar to those of embodiment 1 at the Step S221 and the Step S222. After the Step S624, the image determining section 40 performs the procedure downstream from the Step S605. Thus, it is possible to determine whether the distinguishing pattern is contained in the image being read by the second reading section 2.

After the Step S613, the controlling section 56 determines whether image processing is completed on the back surface image being read by the second reading section 2 or not (S614). In the case that the Step S609 is completed or it is determined at the Step S614 that the image processing has completed on the back surface image (S614: YES), the controlling section 56 stores the first distinctive color range on the setting register 425 as the distinctive color range utilized by the distinctive color extracting section 45 (S615). The controlling section 56 then sets the back surface flag to be "off" state (S616) and completes the procedure.

As described above, the image reading apparatus according to the embodiment 3 calculates the first distinctive color range based on the standard chart being read by the first reading section 1 and calculates the second distinctive color range based on the standard chart being read by the second reading section 2. The image reading apparatus utilizes the first distinctive color range as the distinctive color range required for detecting the distinguishing pattern on the image being read by the first reading section 1. Further, the image reading apparatus replaces the thresholds of the second distinctive color range with the thresholds of the first distinctive color range reordered in the descending sequence about the absolute difference between the thresholds of the first distinctive color range and the second distinctive color range, as the distinctive color range required for detecting the distinguishing pattern on the image being read by the second reading section 2.

In the case that there are many processing, other than the distinguishing pattern detection processing, to be performed by the image reading apparatus, it is considered that the distinguishing pattern detection processing may be started before the distinctive color range is completely set for detecting the distinguishing pattern on the image being read by the second reading section. Even in this case, the image reading apparatus according to the embodiment 3 is likely to already set the thresholds whose differences are large from the first distinctive color and which may cause the decrease of performance about image processing, at the time when the distinguishing pattern detection processing is started for the image being read by the second reading section 2, because the thresholds of the second distinctive color range are reordered in the descending sequence about the absolute difference between the thresholds of the first distinctive color range and the second distinctive color range. Even in the case that there are some remaining thresholds which has not been set yet for detecting the distinguishing pattern on the image being read by the second reading section 2, it is considered that such the remaining thresholds may have small differences from the first distinctive color range and may cause little decrease of performance about image processing. Therefore, it is possible to inhibit the image reading apparatus from decreasing the accuracy for detecting the distinguishing pattern, even if the distinguishing pattern detection processing is started on the image being read by the second reading section 2 before the distinctive color range is not completely set.

Even if a cheap low speed circuit is provided for detecting the distinguishing pattern, it is less likely to cause the decrease of performances of the image reading apparatus according to the embodiment 3. Therefore, it is possible to save costs of the image reading apparatus by providing the cheap circuit, and to inhibit the image reading apparatus from decreasing the accuracy for detecting the copy-protected image. Even in the case that the image reading apparatus according to the present invention are mounted onto a multifunction printer which is often utilized for performing plural processing in parallel, it is possible to save the cost of image reading apparatus.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image reading apparatus, comprising:
    a first reading section that reads a document;
    a second reading section that reads a document;
    a document image storing section that stores a first document image generated from the document being read by the first reading section and that stores a second document image generated from the document being read by the second reading section;
    an output controlling section that controls outputting the first document image and the second document image;
    a distinguishing pattern storing section that stores information about a distinguishing pattern which represents a prohibition of output performed by the output controlling section;
    a determining section that determines whether the first document image and the second document image contain the distinguishing pattern or not;
    a standard chart image storing section that stores a first standard chart image generated from a standard chart being read by the first reading section and that stores a second standard chart image generated from a standard chart being read by the second reading section;
    a sample data storing section that stores sample data;
    a first calculating section calculates a first correction parameter from a comparison between the sample data and the first standard chart image;
    a second calculating section that calculates a second correction parameter from a comparison between the sample data and the second standard chart image, wherein
    the determining section determines, on the basis of the first correction parameter, the first document image and the information about the distinguishing pattern, whether the first document image contains the distinguishing pattern or not,
    the determining section determines, on the basis of the second correction parameter, the second document image and the information about the distinguishing pattern, whether the second document image contains the distinguishing pattern or not, and
    the output controlling section prohibits outputting an image on which the determining section has determined that the distinguishing pattern is contained;and
    a first setting section that sets a first distinctive color range based on the first correction parameter and the information stored by the distinguishing pattern storing section, wherein
    the first distinctive color range is configured with thresholds defining ranges of plural color parameter values,
    the determining section determines on the basis of the first distinctive color range whether the first document image contains the distinguishing pattern or not, and
    further on the basis of the first distinctive color range, the determining section determines whether the second document image contains the distinguishing pattern or not.

2. An image reading apparatus according to claim 1, wherein
    the standard chart being read by the first reading section is substantially the same as the standard chart being read by the second reading section.

3. An image reading apparatus according to claim 2, wherein
    the first reading section reads a surface of a document, and the second reading section reads another surface of the document being read by the first reading section.

4. An image reading apparatus according to claim 3, further comprising:
    a scanner platen that places a document; and
    a conveying section that conveys the document placed on the scanner platen, wherein
    the first reading section reads a surface of the document conveyed by the conveying section, and the second reading section reads another surface of the document conveyed by the conveying section.

5. An image reading apparatus according to claim 1, wherein
    the standard chart being read by the first reading section and the standard chart being read by the second reading section are colored with plural colors each of which is provided with a predetermined chroma and a predetermined density, and
    the information stored by the distinguishing pattern storing section is configured with a range of a color parameter value about a color representing the distinguishing pattern.

6. An image reading apparatus according to claim 5, wherein
    the range of the color parameter value sets thresholds of the color parameter value.

7. An image reading apparatus according to claim 1, wherein
    the determining section determines whether the second document image contains the distinguishing pattern or not, after determining whether the first document image contains the distinguishing pattern or not.

8. An image reading apparatus according to claim 1, wherein
    the distinguishing pattern storing section stores information about a plurality of distinguishing patterns.

9. An image reading apparatus according to claim 1, further comprising:
    a second setting section that sets a second distinctive color range based on the second correction parameter and the information stored by the distinguishing pattern storing section, the second distinctive color range being configured with thresholds defining ranges of plural color parameter values; and
    a substituting section that substitutes with a threshold of the first distinctive color range whose difference is not less than a predetermined value from a related threshold of the second distinctive color range for the related threshold of the second distinctive color range, after the determining section determines whether the first document image contains the distinguishing pattern or not, wherein
    the determining section determines on the basis of the first distinctive color range having been substituted by the substituting section whether the second document image contains the distinguishing pattern or not.

10. An image reading apparatus according to claim 9, wherein
the first distinctive color range and the second distinctive color range are configured with a range of intensity value about red color, a range of intensity value about green color, a range of intensity value about blue color, a range of value that is calculated by a subtraction of the intensity value about red color from the intensity value about green color, a range of value that is calculated by a subtraction of the intensity value about blue color from the intensity value about green color, and a range of value that is calculated by a subtraction of the intensity value about green color from the intensity value about red color.

11. An image reading apparatus according to claim 1, further comprising:
a second setting section that sets a second distinctive color range based on the second correction parameter and the information stored by the distinguishing pattern storing section, the second distinctive color range being configured with thresholds defining ranges of plural color parameter values; and
a reordering section that reorders the thresholds of the second distinctive color range in a descending sequence about absolute difference from the thresholds of the first distinctive color range, after the determining section determines whether the first document image contains the distinguishing pattern or not, wherein
the determining section determines on the basis of the second distinctive color range that has been reordered by the reordering section and has been replaced with the first distinctive color range whether the second document image contains the distinguishing pattern or not.

12. An image reading apparatus according to claim 11, wherein
the first distinctive color range and the second distinctive color range are configured with a range of intensity value about red color, a range of intensity value about green color, a range of intensity value about blue color, a range of value that is calculated by a subtraction of the intensity value about red color from the intensity value about green color, a range of value that is calculated by a subtraction of the intensity value about blue color from the intensity value about green color, and a range of value that is calculated by a subtraction of the intensity value about green color from the intensity value about red color.

13. An image reading apparatus according to claim 1, further comprising:
a second setting section that sets a second distinctive color range based on the second correction parameter and the information stored by the distinguishing pattern storing section, the second distinctive color range being configured with thresholds defining ranges of plural color parameter values, wherein
the first distinctive color range and the second distinctive color range are configured with a range of intensity value about red color, a range of intensity value about green color, a range of intensity value about blue color, a range of value that is calculated by a subtraction of the intensity value about red color from the intensity value about green color, a range of value that is calculated by a subtraction of the intensity value about blue color from the intensity value about green color, and a range of value that is calculated by a subtraction of the intensity value about green color from the intensity value about red color.

14. A method for processing images being read by a first reading section and a second reading section, the method comprising:
storing information about a distinguishing pattern that represents a prohibition of image output;
storing sample data;
making the first reading section read a document;
making the second reading section read a document;
storing a first document image generated from the document being read by the first reading section and a second document image generated from the document being read by the second reading section;
making the first reading section read a standard chart;
making the second reading section read a standard chart;
storing a first standard chart image generated from the standard chart being read by the first reading section and a second standard chart image generated from the standard chart being read by the second reading section;
calculating a first correction parameter based on a comparison between the sample data and the first standard chart image;
calculating a second correction parameter based on a comparison between the sample data and the second standard chart image;
determining whether the first document image contains the distinguishing pattern or not, on the basis of the first correction parameter, the first document image and the information of the distinguishing pattern;
determining whether the second document image contains the distinguishing pattern or not, on the basis of the second correction parameter, the second document image and the information of the distinguishing pattern;
prohibiting an output of an image on which it has been determined that the distinguishing pattern is contained;
setting an distinctive color range that is based on the first correction parameter and the information about the distinguishing pattern and is configured with thresholds defining ranges of plural color parameter values;
determining on the basis of the distinctive color range whether the first document image contains the distinguishing pattern or not; and
determining on the basis of the distinctive color range whether the second document image contains the distinguishing pattern or not.

15. A method according to claim 14, wherein
the first reading section reads a surface of a document, and the second reading section reads another surface of the document being read by the first reading section.

16. A method according to claim 14, further comprising:
storing information about a plurality of distinguishing patterns which represents a prohibition of image output.

* * * * *